(12) United States Patent
Inaba

(10) Patent No.: US 6,466,746 B2
(45) Date of Patent: Oct. 15, 2002

(54) STEREO CAMERA

(76) Inventor: Minoru Inaba, No. 1116, Oaza Samukawa, Oyama-shi, Tochigi-ken (JP)

(*) Notice: Subject to any disclaimer, the term of this patent is extended or adjusted under 35 U.S.C. 154(b) by 0 days.

(21) Appl. No.: 09/920,145

(22) Filed: Aug. 1, 2001

(65) Prior Publication Data

US 2001/0053287 A1 Dec. 20, 2001

Related U.S. Application Data

(62) Division of application No. 09/105,708, filed on Jun. 26, 1998, now Pat. No. 6,292,634.

(51) Int. Cl.⁷ .................................... G03B 35/00
(52) U.S. Cl. ........................... 396/326; 396/338
(58) Field of Search ....................... 396/324, 325, 396/326, 329, 338

(56) References Cited

U.S. PATENT DOCUMENTS

| | | | |
|---|---|---|---|
| 1,596,835 A | 8/1926 | Hewson | 396/326 |
| 1,871,281 A | 8/1932 | Savage | 396/326 |
| 2,458,466 A | 1/1949 | Campbell | 396/325 |
| 2,803,179 A | 8/1957 | Donaldson | 396/326 |
| 2,834,270 A | 5/1958 | Williams | |
| 2,851,937 A | 9/1958 | Ziegler et al. | |
| 3,068,772 A | 12/1962 | MacNeille | 396/141 |
| 3,115,816 A | 12/1963 | Muller | 396/327 |
| 3,608,458 A | 9/1971 | Ratliff, Jr. | 95/18 |
| 3,687,031 A | 8/1972 | Jahnsman | 95/11 |
| 3,953,869 A | 4/1976 | Wah Lo et al. | 396/327 |
| 3,967,300 A | 6/1976 | Oshima | 354/288 |
| 4,040,071 A | 8/1977 | Shane | 396/325 |
| 4,249,798 A | 2/1981 | Moskovich | 350/423 |
| 4,418,993 A | 12/1983 | Lipton | 352/57 |
| 4,437,745 A | 3/1984 | Hajnai | 396/331 |
| 4,462,025 A | 7/1984 | Murakami et al. | 340/743 |
| 4,597,659 A | 7/1986 | Suda et al. | 354/409 |
| 4,712,900 A | 12/1987 | Hamano et al. | 396/133 |
| 4,879,596 A | 11/1989 | Miura et al. | 358/88 |
| 5,355,253 A | 10/1994 | Nanjo et al. | 359/473 |
| 5,504,547 A | 4/1996 | Mizukawa | 354/114 |
| 5,548,362 A | 8/1996 | Wah Lo et al. | 396/326 |
| 5,715,489 A | 2/1998 | Inaba | |
| 5,737,655 A | 4/1998 | Inaba | |
| 5,778,268 A | 7/1998 | Inaba | |
| 5,892,994 A | 4/1999 | Inaba | |
| 6,292,634 B1 * | 9/2001 | Inaba | 396/326 |

* cited by examiner

*Primary Examiner*—David M. Gray
(74) *Attorney, Agent, or Firm*—Fattibene & Fattibene; Paul A. Fattibene; Arthur T. Fattibene

(57) ABSTRACT

A stereo camera capable of photographing a stereo picture maintaining an optimum stereo effect. Right and left lens boards 42R, 42L of a stereo camera 41 are coupled to a camera body 46 via upper and lower two sets of parallel links 47. Parallel grooves 45L, 45R are formed in the lateral direction in the inner portions of the lens boards 42L, 42R, and with which a circular eccentric cam 43 is engaged. When the shaft mounting the cam 43 is turned, the right and left lens boards 42R and 42L move in parallel describing circular loci, making it possible to automatically adjust the focal point as well as the distance between the optical axes of the lenses, which is important for accomplishing a stereo effect.

19 Claims, 23 Drawing Sheets f = 36mm, P = 66mm

| Δif | sℓ | βa | Xa | Xa−sℓ | distance L |
|---|---|---|---|---|---|
| 0 | 0 | 29.6185° | 0.470 | 0.47 | ∞ |
| 0.5 | 0.452 | 30.9543° | 0.762 | 0.31 | 2628 |
| 1.0 | 0.892 | 32.3090° | 1.070 | 0.1780 | 1332 |
| 1.344 | 1.188 | 33.2529° | 1.291 | 0.103 | 1000 |
| 1.5 | 1.320 | 33.6843° | 1.395 | 0.075 | 900 |
| 2.0 | 1.737 | 35.0820° | 1.737 | 0 | 684 |
| 2.5 | 2.143 | 36.5041° | 2.097 | −0.046 | 554 |
| 3.0 | 2.538 | 37.9528° | 2.477 | −0.061 | 468 |
| 3.5 | 2.924 | 39.4306° | 2.878 | −0.054 | 406 |
| 4.0 | 3.30 | 40.9405° | 3.300 | 0.00 | 360 |

FIG 16 (R)
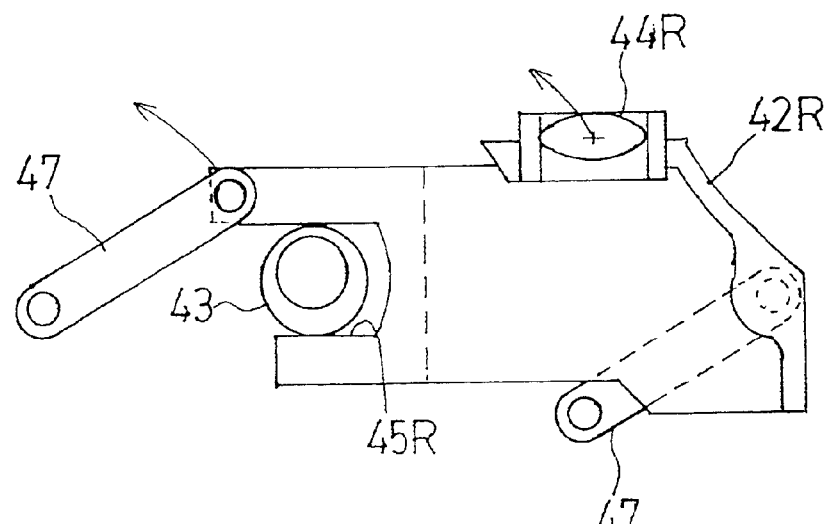
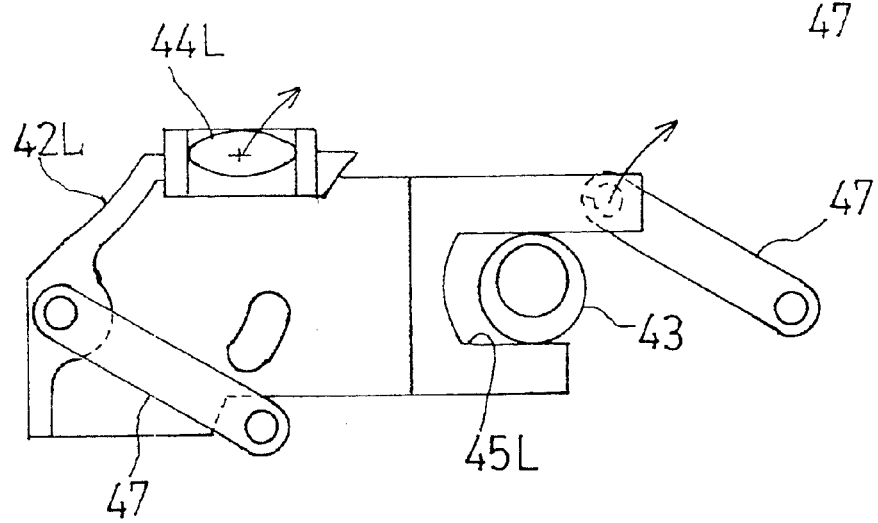
FIG 16 (L)

FIG 18 (R)
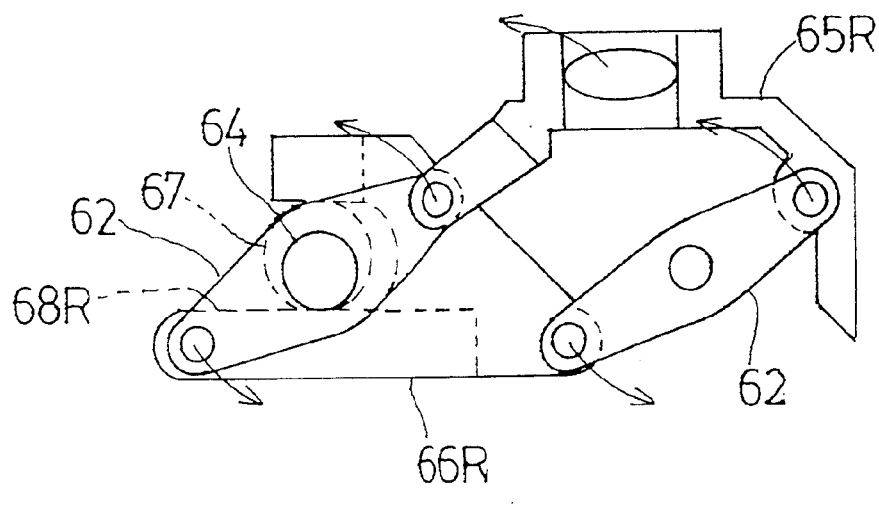
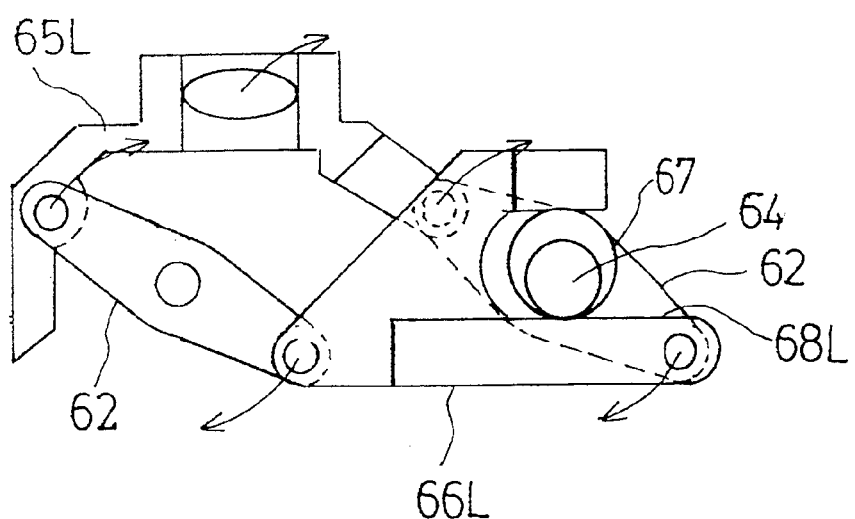
FIG 18 (L)

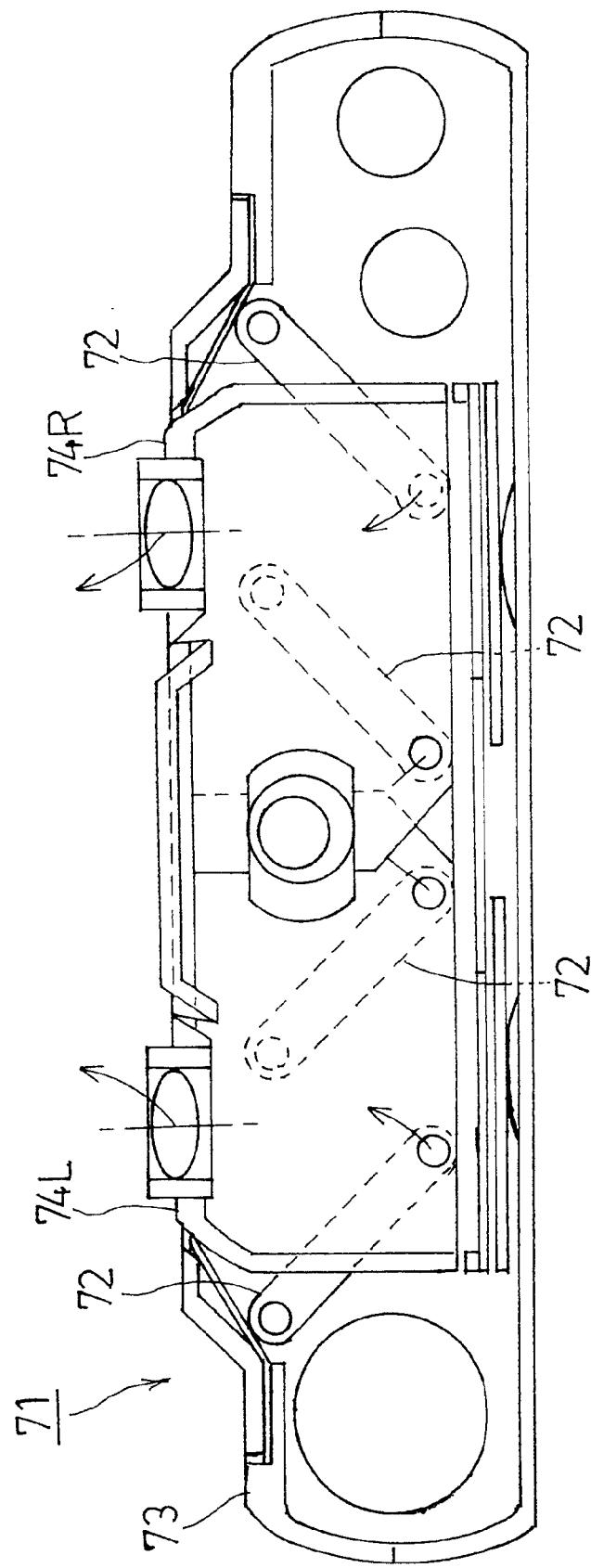

$f=36$mm, $P=66$mm

| Δif | sℓ | distance L |
|---|---|---|
| 0 | 0 | ∞ |
| 0.5 | 0.4520548 | 2628 |
| 1.0 | 0.8918919 | 1332 |
| 1.5 | 1.3200 | 900 |
| 2.0 | 1.7368421 | 684 |
| 2.5 | 2.1428571 | 554 |
| 3.0 | 2.5384615 | 468 |
| 3.5 | 2.9240506 | 406 |
| 4.0 | 3.3000 | 360 |

(Prior Art)

STEREO CAMERA

This application is a division of application Ser. No. 09/105,708 filed Jun. 26, 1998, now U.S. Pat. No. 6,292,634.

BACKGROUND OF THE INVENTION

1. Field of the Invention

The present invention relates to a stereo camera. More particularly, the invention relates to a stereo camera which adjusts the distance between the optical axes of two photographing lenses being interlocked to the operation for adjusting the focal point.

2. Background of the Invention

In a stereo camera which takes two pieces of pictures at one time through a pair of right and left photographing lenses, the distance between the optical axes of the two photographing lenses has generally been fixed. In the stereo camera of this type in which the distance between the optical axes is fixed as shown in FIGS. 20(L) and 20(R) in an exaggerated manner, there develop non-overlapped regions (a–b, c–d) on the outer sides of the overlapped region (b–c) of the right and left photographed pictures L and R due to parallax of the two photographing lenses. As the distance to the subject becomes closer, furthermore, the position of the image of the subject in the right and left photographed pictures undergo a displacement toward the directions to approach each other.

The non-overlapped regions (a–b, c–d) are the portions where no stereo image is formed. When viewed by using a stereo slide viewer, the picture frames of the slide mount are overlapped on the boundaries of the non-overlapped regions as shown in FIG. 21, which is offensive to see. Besides, a stereo image of the subject at a distance closer than a focal distance appears in front of the stereo window (imaginary window in which the right and left picture frames of the mount become in agreement and appear as one picture when the stereo slide is viewed in a three-dimensional manner), which is unnatural. The stereo slides that have been proposed are accompanied by the above-mentioned defects.

In order to correct these defects, therefore, it has been attempted to mask the non-overlapped regions (a–b, c–d) of the right and left pictures by using a stereo slide mount having windows of a width narrower than the width of the pictures on the films, and to correct the perspective feeling by adjusting the pitch between the right and left films. The above method, however, is accompanied by a difficulty for determining a proper masking amount and for determining the positions of the films relative to the windows of the mount in the transverse direction and, besides, involves large loss of picture due to masking.

The above-mentioned problems caused by a difference in the visual field between the right and left photographing lenses can be solved by correcting the visual field by adjusting the distance between the optical axes of the right and left photographing lenses. As the devices for adjusting the distance between the optical axes of the stereo camera, there have been known the one of the manually adjusting type for adjusting the distance between the optical axes irrespective of the focal point-adjusting mechanism and the one of the automatically adjusting type for adjusting the distance between the optical axes being interlocked to a mechanism for adjusting the focal point. The device of the manually adjusting type is capable of adjusting the distance between the optical axes of the lenses to an optimum value depending upon a distance to the main subject and upon a distance between the main subject and another subject, but requires cumbersome operation for separately adjusting the focal point and the distance between the optical axes. Though scenery and still life can be photographed without interruption, this method lacks performance for quickly shooting pictures. Besides, the user may incorrectly set the distance between the optical axes unless he is well accustomed to the operation and function of the mechanism for adjusting the distance between the optical axes, which is never easy to handle. Accordingly, the automatic mechanism for adjusting the distance between the optical axes is more suited for a stereo camera used by general public than the manual mechanism for adjusting the distance between the optical axes.

The conventional automatic mechanism for adjusting the distance between the optical axes has been so constituted that the visual fields of the right and left photographing lenses are brought into agreement at all times at a focal distance and that the distance between the optical axes is automatically adjusted being interlocked to the adjustment of the focal point to obtain a constant effect for correcting the distance between the optical axes.

If it is presumed that the lens is a thin lens and, focal distance of the lens f distance from the subject to a main point of the lens L distance from the focal point of the lens to the image-forming position $\Delta if$ then, $$\Delta if = f^2/(L-f) \quad (1)$$

and the distance from the main point of the lens to the surface of the film is given by $f+\Delta if$.

FIG. 22 illustrates loci of motion of main points of the photographing lenses at the focal distance for bringing into agreement the visual fields of the right and left photographing lenses. When the pitch between the right and left exposed pictures of the stereo camera is denoted by P, the shifting amount Sl of the right and left lenses for bringing into agreement the visual fields of the right and left photographing lenses at the focal distance is given by, $$Sl = (P/2) \times (f+\Delta if)/(L+f+\Delta if) \quad (2)$$

A table of FIG. 23 illustrates relationships between the delivering amounts $\Delta if$ of the lenses in the direction of the optical axes and the shifting amounts Sl in the direction at right angles with the optical axes based upon the above-mentioned formula when a focal distance of the lenses is 36 mm and the pitch P between the right and left exposed pictures is 66 mm. When the right and left photographing lenses are moved toward the directions to approach each other by the shifting amount Sl accompanying a decrease in the distance L to the subject that is focused, the loci of motion of main points of the photographing lenses describe a loose curve, and the visual fields of the right and left photographing lenses at the focal distance are brought into agreement at all times.

The conventional mechanism for automatically adjusting the distance between the optical axes is so constituted that the main points of the photographing lenses move on loci given by the above-mentioned formula by using a cam, a guide and the like, and that the focal point is adjusted being interlocked to the adjustment of the distance between the optical axes. In practice, however, a satisfactory effect for correcting the distance between the optical axes is not obtained in many cases.

This problem is caused by the fact that all subjects in the picture seldom exist at a focal distance and, in many cases, the subjects are existing at various distances. For example, when a scenery is to be photographed by bringing the focal point to infinity, some material bodies are in many cases photographed in front of the subject at infinity. In taking a picture from a close distance, e.g., in shooting flowers in a flower garden from an upper tilted direction, the picture includes flowers in front of the flowers at the central portion of the picture to where the focal point is adjusted. When a front portrait is to be shot by adjusting the focal point to the eyes of a human model, the nose of the model is, then, located in front of the focal distance.

In a stereo slide in which the subject that strongly affects the matching of the right and left images exists at a distance closer than the subject at the focal distance, the stereo image of the subject at the closer distance is formed in front of the stereo windows and appears unnatural. To correct this, it becomes necessary to mask the outer side edges of the right and left pictures when the films are to be mounted in the same manner as in the prior art and to correct the perspective feeling by adjusting the pitch for mounting the right and left films. Thus, the action of the conventional mechanism for automatically adjusting the distance between the optical axes is never perfect.

Therefore, a technical problem must be solved in order to provide a stereo camera having a practicable function for adjusting the distance between the optical axes so that stereo pictures featuring an optimum stereo effect can be easily shot by anybody. The object of the present invention is to solve this problem.

SUMMARY OF THE INVENTION

The present invention is proposed in order to achieve the above-mentioned object, and provides a stereo camera provided with a mechanism for automatically adjusting the distance between the optical axes, in which two photographing lenses are mounted on independent lens boards, the distance between the right and left lens boards is changed being interlocked to the back-and-forth motion of the lens boards accompanying the operation for adjusting the focal point, and the distance between the optical axes of the two photographing lenses is corrected depending upon the focal distance, wherein the loci of motion of the two photographing lenses are right-and-left symmetrical straight lines connecting the positions at where the distance between the optical axes of the two photographing lenses at a position for adjusting the focal point to infinity is narrower than a pitch between the right and left exposed pictures or, preferably, connecting the positions within a range of distance between the optical axes in which the visual fields of the two photographing lenses are brought into agreement at a distance of 2 to 3 meters in front of the main points of the photographing lenses along the optical axes, to the positions of the distance between the optical axes at where the visual fields of the two photographing lenses at a position for adjusting the shortest focal point are brought into agreement at a focal distance, or to the positions in the vicinities thereof.

The invention further provides a stereo camera in which the loci of motion of the two photographing lenses are right-and-left symmetrical arcs passing through the positions at where the distance between the optical axes of the two photographing lenses at a position for adjusting the focal point to infinity is narrower than a pitch between the right and left exposed pictures or, preferably, through the positions within a range of distance between the optical axes in which the visual fields of the two photographing lenses are brought into agreement at a distance of 2 to 3 meters in front of the main points of the photographing lenses along the optical axes, and through the positions of the distance between the optical axes at where the visual fields of the two photographing lenses at a position for adjusting the shortest focal point are brought into agreement at a focal distance or through the positions at where the distance between the optical axes is slightly narrower than the distance between the optical axes with which the visual fields are in agreement at the focal distance.

BRIEF DESCRIPTION OF THE DRAWINGS

FIG. 8 is a table expressing the arcuate locus of motion of FIG. 6 using numerical figures;

FIGS. 16(L) and 16(R) are diagrams illustrating the constitutions of parallel linking mechanisms in the stereo camera of FIG. 15;

FIGS. 18(L) and 18(R) are diagrams illustrating the constitutions of parallel linking mechanisms in the stereo camera of FIG. 17;

FIG. 19 is a sectional view of the stereo camera of the type of arcuate motion according to a further embodiment;

FIG. 23 is a table of numerical values representing distances between the optical axes with which the visual fields of the right and left photographing lenses are brought into agreement at the focal distance.

DETAILED DESCRIPTION OF THE PREFERRED EMBODIMENTS

Embodiments of the present invention will now be described in detail. First, described below is a relationship between a distance at which the right and left windows of a stereo slide mount are brought into agreement to appear as a single window and a distance at which a stereo image of a subject can be seen in viewing a stereo slide by using a stereo slide viewer.

In a stereo slide photographed by using a conventional stereo camera of the type of automatically adjusting the distance between the optical axes in which the visual fields of the right and left lenses are brought into agreement at a focal distance, the visual fields of the right and left lenses are in agreement at the focal distance, and a stereo image of a subject at the focal distance and the window of the stereo slide mount appear at an equal distance.

Figure 22:
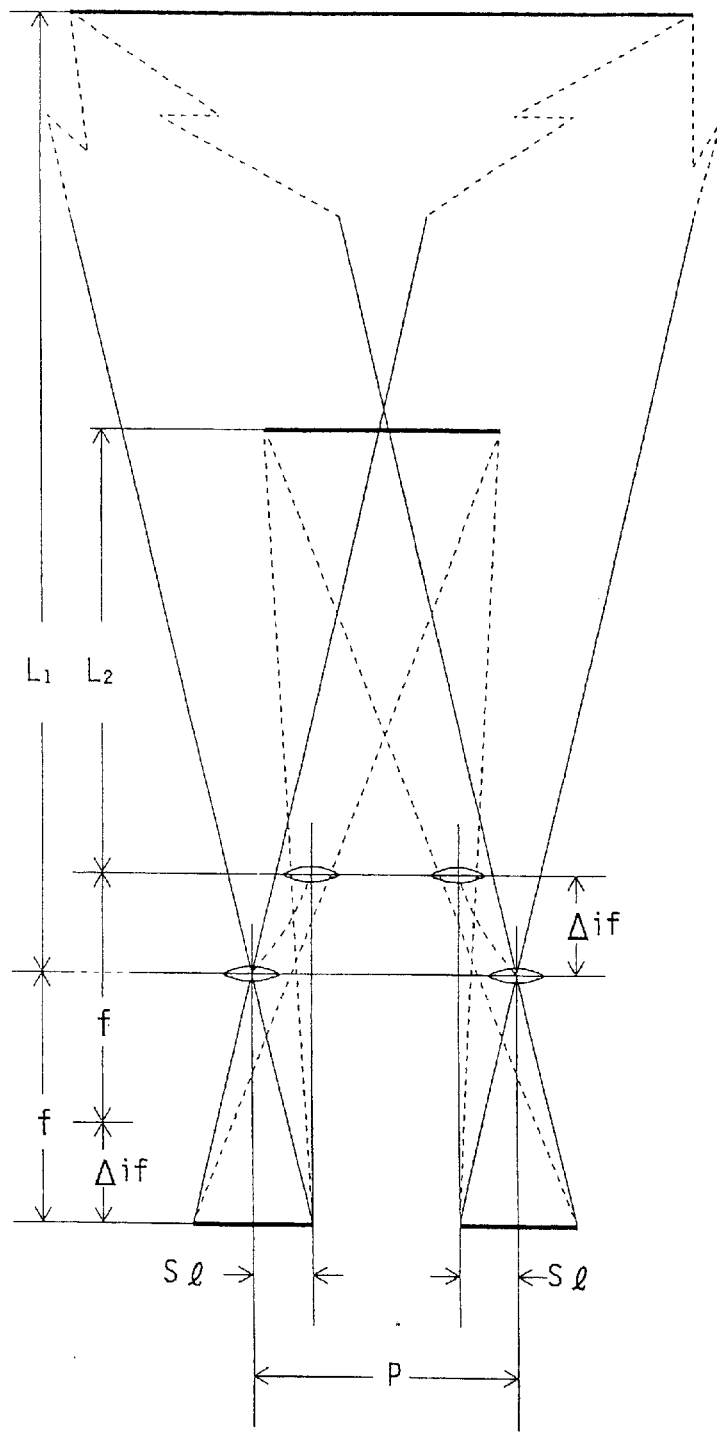
FIG. 22 is a diagram illustrating curved loci of motion of lenses when the visual fields of the right and left lenses are brought into agreement at a focal distance.

When, for example, a scenery at an infinity is photographed as shown in FIG. 22, the shifting amount Sl of the lens is zero. Accordingly, a pitch between the right and left pictures is equal to a pitch of the same subject at infinity between the right and left pictures, and the window of the stereo slide mount is seen at infinity like the subject at infinity and the subject which is not at infinity is seen being located in front of the window of the stereo slide mount, which is unnatural. It is therefore presumed that a good result can be obtained if the photographing lenses are so shifted that the visual fields of the right and left photographing lenses are brought into agreement at a distance shorter than the focal distance.

Therefore, considered below first is the shifting amount of the photographing lenses of when the focal point is adjusted to infinity.

When, focal distance of the photographing lens f=36 mm, pitch between the right and left exposed pictures P=66 mm, and pitch between the subjects at the focal distance=Pi, which are the conditions same as those of the prior art, a stereo image of the subject at a distance of, for example, one meter and the window of the stereo slide mount can be seen at an equal distance when the shifting amount Sl of the photographing lenses is about 1.15 mm from the formula 2 when the focal point is adjusted to infinity. In this case, the images of the subjects at infinity move equally to the shifting amount of the photographing lenses on the exposed pictures of the films, i.e., respectively shifted by 1.15 mm in the directions in which they approach each other and, hence, the pitch Pi decreases by 2.3 mm between the images of the subjects at infinity on the right and left films. The image of the exposed picture of the stereo camera is an inverted image which is inverted right side left and upside down. When the films photographed with the shifting amount Sl of 1.15 mm are mounted in a state of erect images on the stereo slide mount, the pitch Pi between the subjects at infinity becomes larger by 2.3 mm than the pitch P (66 mm) between the right and left pictures.

When the pitch Pi between the subjects at the focal distance (infinity in this case) becomes very wider than the pitch P between the right and left pictures, the images will appear unnaturally as a matter of course. In order to examine the permissible range of expansion, the inventor has observed a variety of sample photographs varying the shifting amount of the photographing lenses. As a result, it was evaluated that a difference between the pitch of the right and left pictures and the pitch of the images of the same subject of the right and left pictures, should not generally be larger than about 1.2 mm.

That is, when the shifting amount Sl of the right and left photographing lenses is not larger than 0.6 mm at the time of photographing a subject at infinity under the above-mentioned conditions, the difference between the pitch of the pictures and the pitch of the images of the same subject at infinity of the right and left pictures becomes not larger than 1.2 mm, and the image at infinity does not appear unnaturally, and favorable three-dimensional feeling is obtained despite there exists an image of a subject at a short distance in the picture.

Though the shifting amount of the photographing lenses in the case of infinity is set to be 0.6 mm, this value of 0.6 mm is nearly equal to the shifting amount Sl with which the window of the stereo slide mount is seen at an equal distance as the subject of about 2 meters as calculated from the formula 2.

Next, considered below is the shifting amount of the photographing lenses in the case of the shortest focal distance. Even in the case of the shortest focal distance, the condition is applied in that the pitch between the images of the subject at a focal distance is wider by about 1.2 mm than the pitch between the windows of the stereo slide mount like the case of photographing a subject at infinity. That is, when the shortest focal distance is L=360 mm, $$\Delta if = f^2/(L-f) = 36^2/(360-36) = 4 \text{ mm}$$

The moving amount Si of the image on either the right or left picture is 1.2/2=0.6 mm. In this case, the shifting amount Sl of the photographing lenses is given by, $$Sl = (P - (L \times Pi)/(L + f + \Delta if))/2$$

$$= (P - (L \times (P - 1.2))/(L + f + \Delta if))/2$$

$$= (66 - (360 \times (66 - 1.2))/(360 + 36 + 4))/2$$

$$= 3.84 \text{ mm}$$

Furthermore, the distance Lw with which the visual fields of the right and left photographing lenses are brought into agreement, i.e., the distance with which the right and left windows of the stereo slide mount appears as a single window, is given as follows:

$$Lw = (f + \Delta if)(P - 2Sl)/2Sl$$

$$= (36 + 4)(66 - 2 \times 3.84)/2 \times 3.84 = 304 \text{ mm}$$

Figure 1:
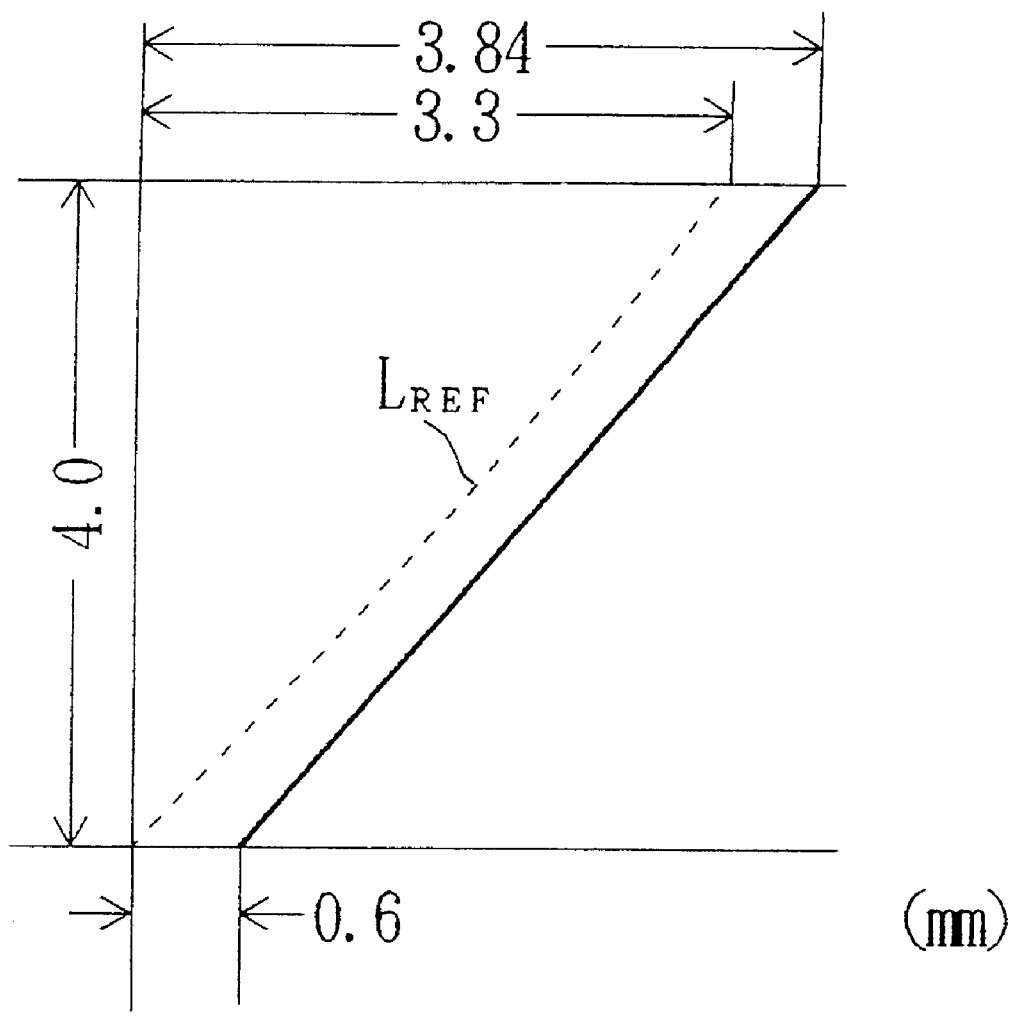
FIG. 1 is a graph illustrating a straight locus of motion of a photographing lens according to an embodiment of the present invention.

FIG. 1 shows the locus of motion of the left photographing lens only, which is described by coupling a position of the lens at the time of shooting a subject at infinity to a position of the lens at the shortest focal distance. The windows of the stereo slide mount are set at a distance of about 2 meters from the main points of the photographing lenses when shooting the subject at infinity, and are set at positions of 304 mm in the case of the shortest focal distance of 360 mm.

In the above-mentioned example, the shifting amount toward the inner side is larger than that of the locus $L_{REF}$ represented by a broken line of the lenses of the conventional stereo camera of the type which automatically adjusts the distance between the optical axes over the whole range for adjusting the focal point. Most of the photographed films can be mounted on the stereo slide mount without correcting the positions for mounting the films or without masking portions of the pictures.

In FIG. 1, furthermore, the angle θ of inclination of the linear locus relative to the optical axis is given by, $$\theta = \tan^{-1}(3.84-0.6)/4 = \tan^{-1} 0.81 = 39°\ 00'$$

and the shifting amount Sl of the lenses in the direction at right angles with the optical axis is given by, $$S1 = 0.6 + \Delta i f \times \tan\theta (\theta = 39°\ 00')$$

Here, the shifting amount Sl of the photographing lenses of when the focal point is brought to a distance of, for example, one meter, is found to be, $$\Delta i f = f^2/(L-f) = 36^2/(1000-36) = 1.344\ mm$$

$$S1 = 0.6 + 1.344 \times \tan 39°\ 00' = 1.688\ mm$$

The moving amount of the image at infinity on the picture is equal to the shifting amount Sl of the photographing lens. Therefore, when the background at infinity is photographed on the picture in the case when the focal point is adjusted to a distance of one meter, the pitch between the images of the background at infinity on the right and left pictures is increased by about 3.4 mm (=2Sl) compared to the pitch between the pictures.

This is in excess of a recommended range (not larger than about 1.2 mm) of the difference between the above-mentioned pitch of pictures and the pitch of images of the subject. It is therefore desired that the background at a distance does not enter as much as possible into the picture when shooting a subject from a close distance.

The above-mentioned locus of motion of the lens is when importance is given to taking a picture from a close distance. However, users in general shoot the subjects at distances of not smaller than one meter. Besides, many cameras have the shortest focal distance of about one meter. In these cases, the shifting amount may be decreased as a whole compared to the amount of FIG. 1 (at a position of adjusting the focal point to infinity as shown, for example, in FIG. 2, the window of the stereo slide mount can be seen at 3 meters when the shifting amount is Sl=0.39 mm), or the angle of inclination of the locus of motion may be decreased with respect to the optical axis of the photographing lens, in order to suppress the problem in that the pitch of image in the background becomes excessive when the subject at a short distance and the background at a distance are photographed on the same picture.

Figure 2:
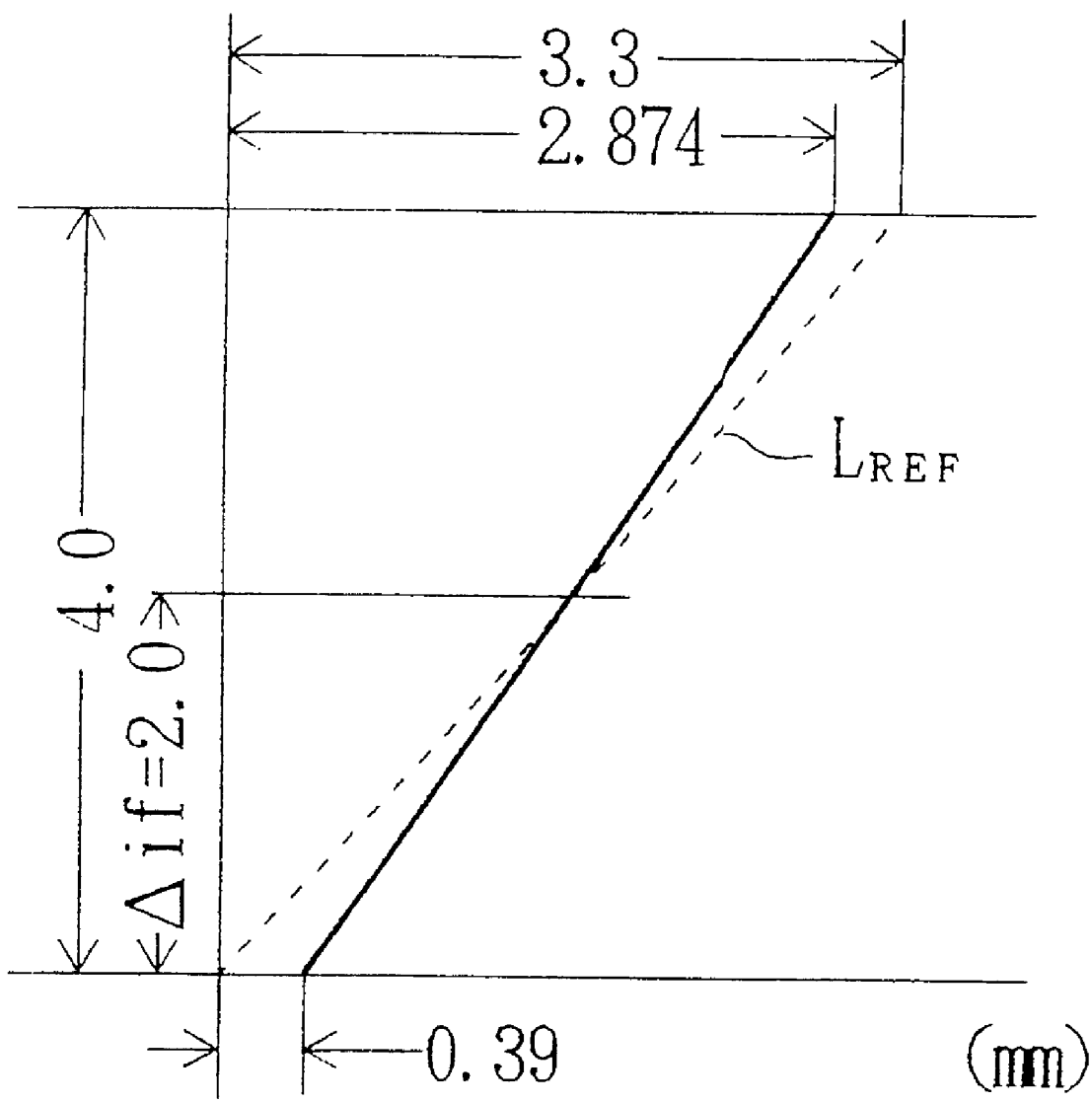
FIG. 2 is a graph illustrating a straight locus of motion of the photographing lens according to the embodiment of the present invention.

Referring to FIG. 2, the locus of motion of the photographing lens intersects a conventional curved locus $L_{REF}$ at a focal distance of about 700 mm (Δif≈2.0 mm). Except when shooting a subject from a close distance, most of the films do not require correction at the time of mounting. Only the films photographed from a close distance may be corrected for their mounting positions or may be masked for their pictures as required.

Figure 3:
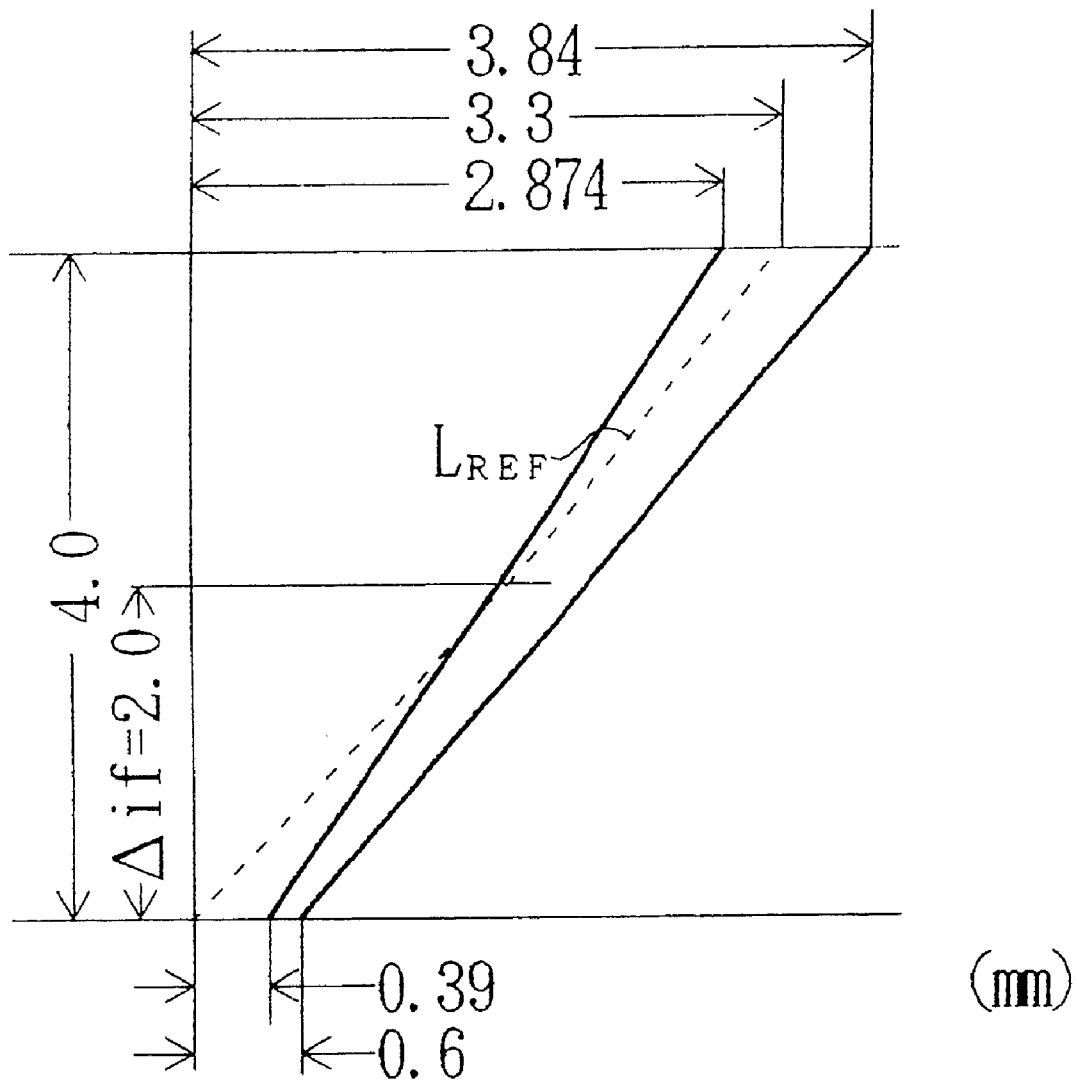
FIG. 3 is a graph illustrating a permissible range for setting a straight locus of motion of the photographing lens according to the embodiment of the present invention.

Therefore, the loci of photographing lenses can be set within a range between the linear locus shown in FIG. 1 and the linear locus shown in FIG. 2 depending upon whether importance is given to shooting pictures from a close distance, importance is given to shooting pictures from general distances, or upon the conditions of the shortest focal distance of the photographing lenses. When a locus is set in a range between the two straight lines as shown in FIG. 3, there is obtained a favorable effect for correcting the distance between the optical axes better than that of the conventional stereo camera. Moreover, since the photographing lenses are linearly moved, the structure of the mechanism for adjusting the distance between the optical axes is simplified, and a high operation precision is accomplished.

In the foregoing was described the case where the photographing lenses were moved along the linear loci. Operation maintaining a high precision can be further expected by using a mechanism for adjusting the distance between the optical axes by moving the photographing lenses along arcuate loci by using parallel linking mechanisms made up of a combination of a plurality of levers and links.

When the arcuate loci are employed, the radius is equal to, or larger than, that of the conventional curved loci, the photographing lenses are inwardly shifted at a position for adjusting the focal point to infinity, the shifting amount is decreased as the lenses are delivered, and the distance of the window of the stereo slide mount is brought nearly in agreement with a distance at which is seen a stereo image of the focused subject at the shortest shooting distance. In this case, however, the arc has a large radius and the links becomes long. Therefore, the mechanism can be incorporated in a large camera but cannot be incorporated in a small camera.

Figure 4:
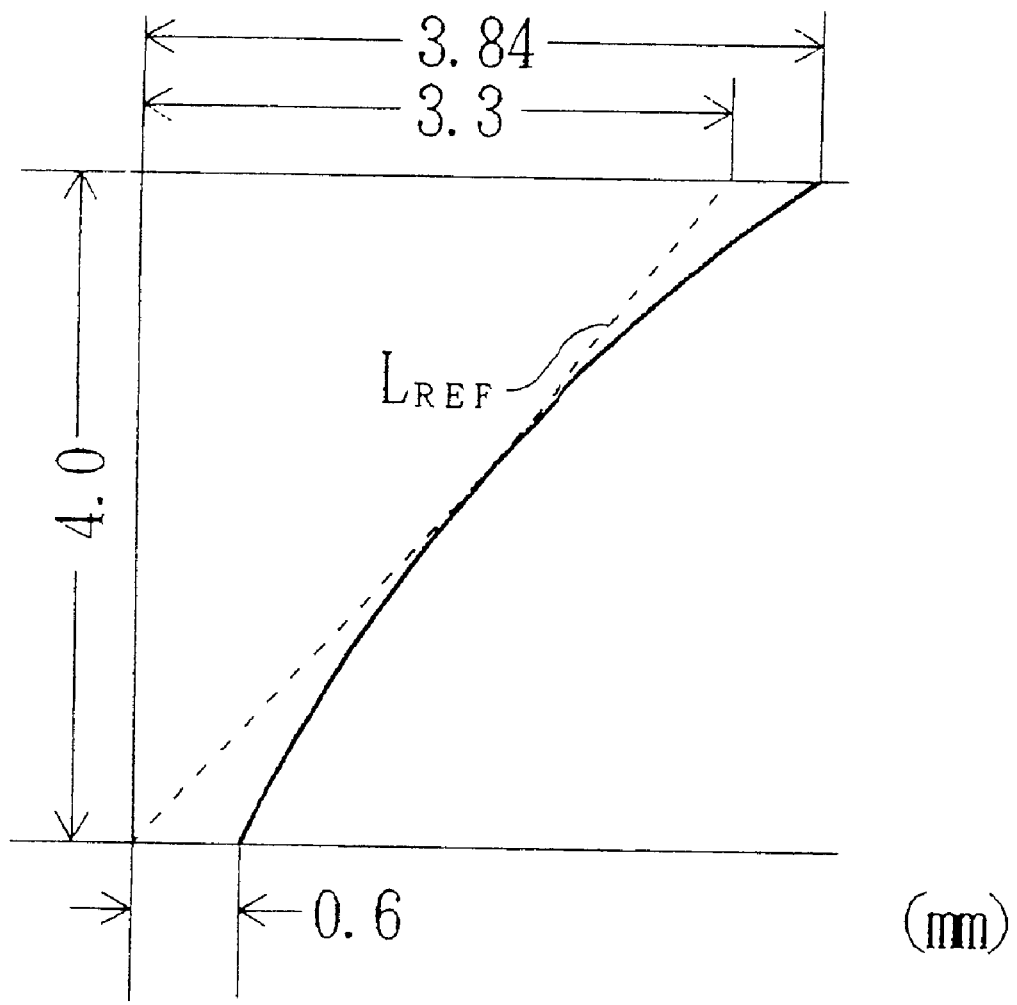
FIG. 4 is a graph illustrating an arcuate locus of motion of the photographing lens according to the embodiment of the present invention.

The radii of arcs can be decreased if, as shown in FIG. 4, the photographing lenses are moved along the arcs having centers of radii on the center sides between the right and left photographing lenses contrary to that of the conventional curved locus $L_{REF}$. The shifting amount may be set within a range of from 0.39 to 0.6 mm so that the window of the stereo slide mount can be seen at a distance of about 2 to 3 meters at a position for adjusting the focal point to infinity. Besides, at the shortest focal distance, the shifting position may be set within a relatively narrow permissible range inclusive of the shifting position of the conventional curved locus $L_{REF}$. However, the position may be set depending upon the conditions such as desired shifting characteristics, focal distance of the lens, shortest focal distance, etc., and no numerical limitation is imposed thereon like that of the linear locus.

Figure 5:
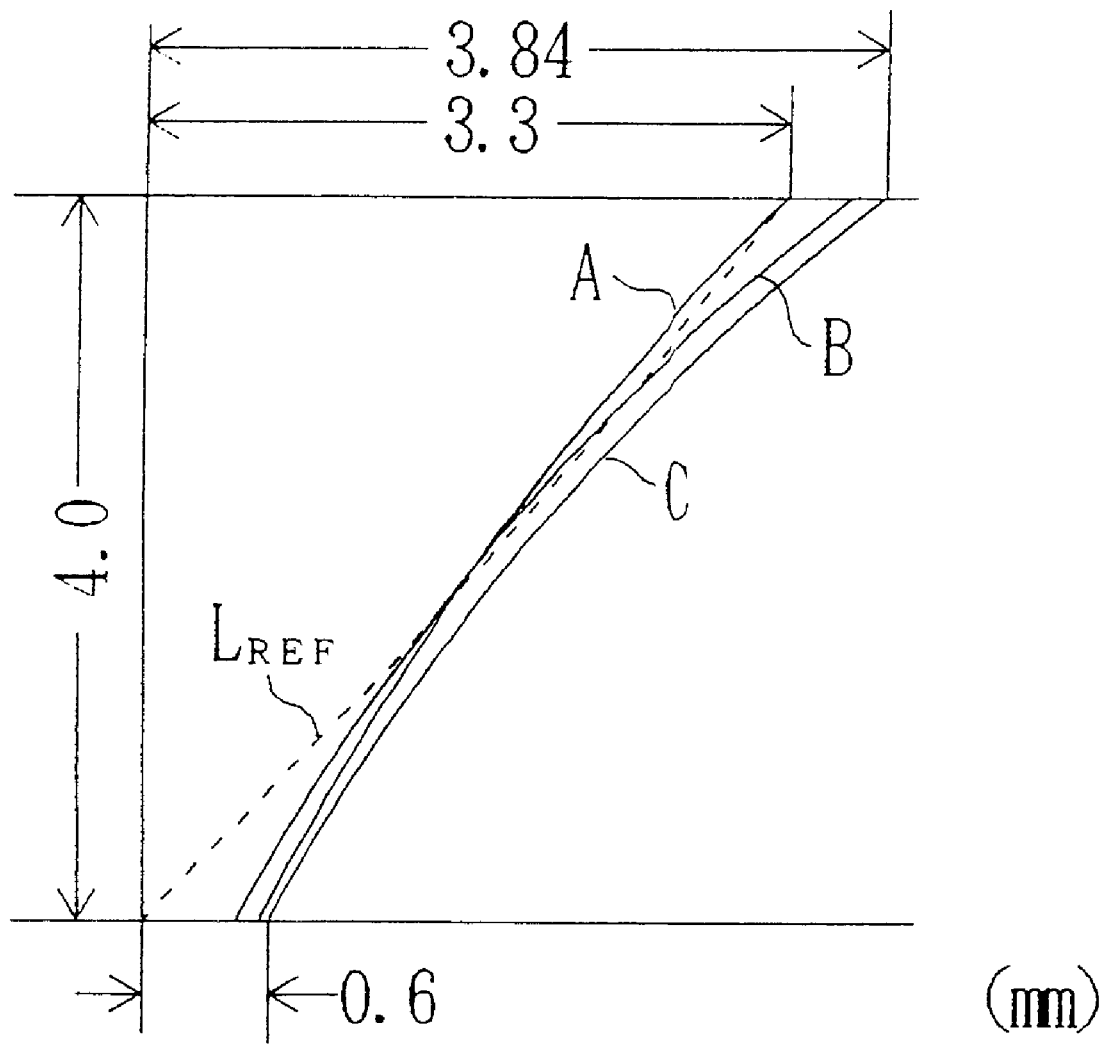
FIG. 5 is a graph illustrating a permissible range for setting the arcuate locus of motion of the photographing lens according to the embodiment of the present invention.

Therefore, a variety of arcs having different centers of arcs and different radii of arcs can be set as represented by arcs A, B and C in FIG. 5. Like the range of linear loci shown in FIG. 3, however, the arcs are limited within a range which is not much displaced from the conventional curved locus $L_{REF}$ as a matter of course.

In FIG. 5 the arc A represents the locus of motion of the lens of a stereo camera of of another embodiment, with which the window of the stereo slide mount appears at a distance of about 2 meters when the focal point is adjusted to infinity, a stereo image of a subject at a focal distance (e.g., 700 mm) appears at a distance equal to that of the window of the stereo slide mount at any intermediate position within a range for adjusting the focal point, and, on the side of short distances, the stereo image of the subject at the focal distance appears again at a distance equal to that of the window of the stereo slide mount at the shortest focal distance though the shifting amount becomes insufficient.

The arc B represents the locus of motion of the lens of a stereo camera of another embodiment, with which the window of the stereo slide mount appears at a distance of about 2 meters when the focal point is adjusted to infinity, a stereo image of a subject at a focal distance appears at a distance equal to that of the window of the stereo slide mount at an intermediate position within a range for adjusting the focal point, and, on the side of short distances, the stereo image of the subject at the focal distance appears at the back of the window of the stereo slide mount. The arc B has a radius smaller than that of the arc A, and makes it possible to shorten the length of the The arc C represents the locus of motion of the lens of a stereo camera of another embodiment. The center of radius of the arc B is shifted inward (towards the right in FIG. 5) to increase the shifting amount over the whole areas so that the arc C will not come into contact with the conventional curved locus $L_{REF}$.

Figure 6:
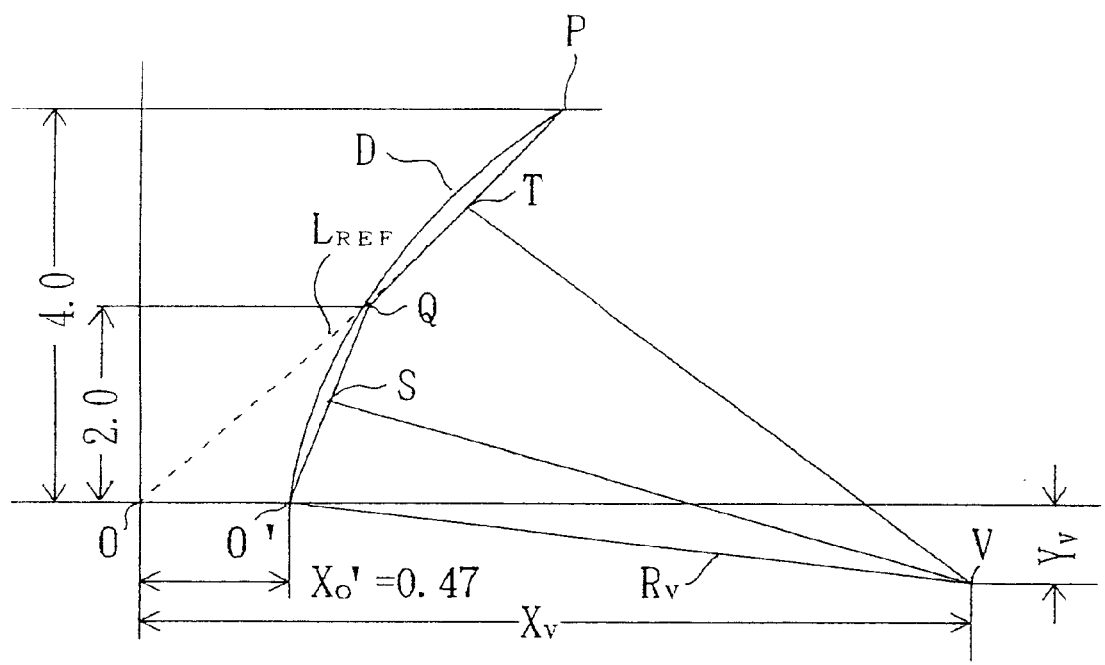
FIG. 6 is a graph illustrating the arcuate locus of motion of the photographing lens according to the embodiment of the present invention.

Described below is a calculation for finding a locus of an arc D shown in FIG. 6. When the focal distance of the lens is 36 mm, the pitch $P_1$ between the right and left exposed pictures is 66 mm, the distance with which the visual fields of the right and left lenses come into agreement is 2.5 meters when the focal point is adjusted to infinity, and the position of the lens is O' like in the above-mentioned example, then, from the formula 2, the shifting amount of the point O' is given by, $$Sl=(66/2)\times 36/(2500+36)=0.468 \text{ mm}$$

and the distance Xo' between the point O and the point O' becomes about 0.47 mm. Then, a point where an arc which is the locus of motion of the lens intersects the conventional curve represented by a broken line is denoted by Q, a chord O'Q is drawn between O' and Q of the arc and, similarly, a chord PQ is drawn between P and Q of the arc. A perpendicular A is drawn from an intermediate point S of the chord O'Q, a perpendicular B is drawn from an intermediate point T of the chord PQ, and a point where the perpendiculars A and B meet together is found. This intersecting point is a center V of the arc O'QP.

The coordinate position of the point O' is x=0.47, y=0. If $\Delta$if of the point Q is 2 mm which is an intermediate point of the range of 4 mm in which the lens moves in the direction of the optical axis, then, the x-coordinate of the point Q is x≈1.7368 and the y-coordinate is y=2 from the table of FIG. 23.

A difference in the x-value between the point O' and the point Q is given by, $$X_Q-X_O'=1.7368-0.47=1.2668$$

A difference in the y-value is, $$y_Q-y_O'=2$$

The ratio of inclination of the chord O'Q relative to the optical axis is 1.2668/2=0.6334.

The coordinate position of the point S is, $$x=(0.47+1.7368)/2=1.1034$$

$$y=2/2=1$$

The y-value on the perpendicular A when x=0 is, $$y=1+1.1034\times 0.6334=1.69889356$$

and the numerical formula representing the perpendicular A is given by, $$y=-0.6334X+1.69889356$$

Similarly, a difference in the y-value between the point P and the point Q on the perpendicular B is, $$y_Q-y_O'4-2=2$$

From FIG. 23, a difference in the x-value is, $$X_P-X_Q=3.30-1.7368=1.5632$$

The ratio of inclination of the chord PQ relative to the optical axis is, $$1.5632/2=0.7816$$

The coordinate position of the point T is, $$x=(3.30+1.7368)/2=2.5184$$

$$y=(4+2)/2=3$$

The y-value on the perpendicular B when x=0 is, $$y=3+2.5184\times 0.7816=4.96838144$$

and the perpendicular B is expressed as, $$y=-0.7816X+4.96838144$$

The coordinates are in agreement at a point where the perpendiculars A and B intersect and, hence, $$-0.6334X+1.69889356=-0.7816X+4.96838144$$

Upon transposition, $$-0.6334X+0.7816X=4.96838144-1.69889356$$

By rearranging both sides, $$0.1482X=3.26948788$$

X=22.06132173
Furthermore, $$y=-0.7816\times 22.0613+4.9683=-12.2748$$

$$X_V=22.0613 \text{ mm}$$

$$Y_V=-12.2748 \text{ mm}$$

Since the point O' is positioned on the arc D, the radius $R_V$ of the arc D is given by, $$R_V=\sqrt{((X_V-X_O')^2+Y_V^2)}=\sqrt{((22.0613-0.47)^2+12.2748^2)}=24.83656 \text{ mm}$$

Figure 7:
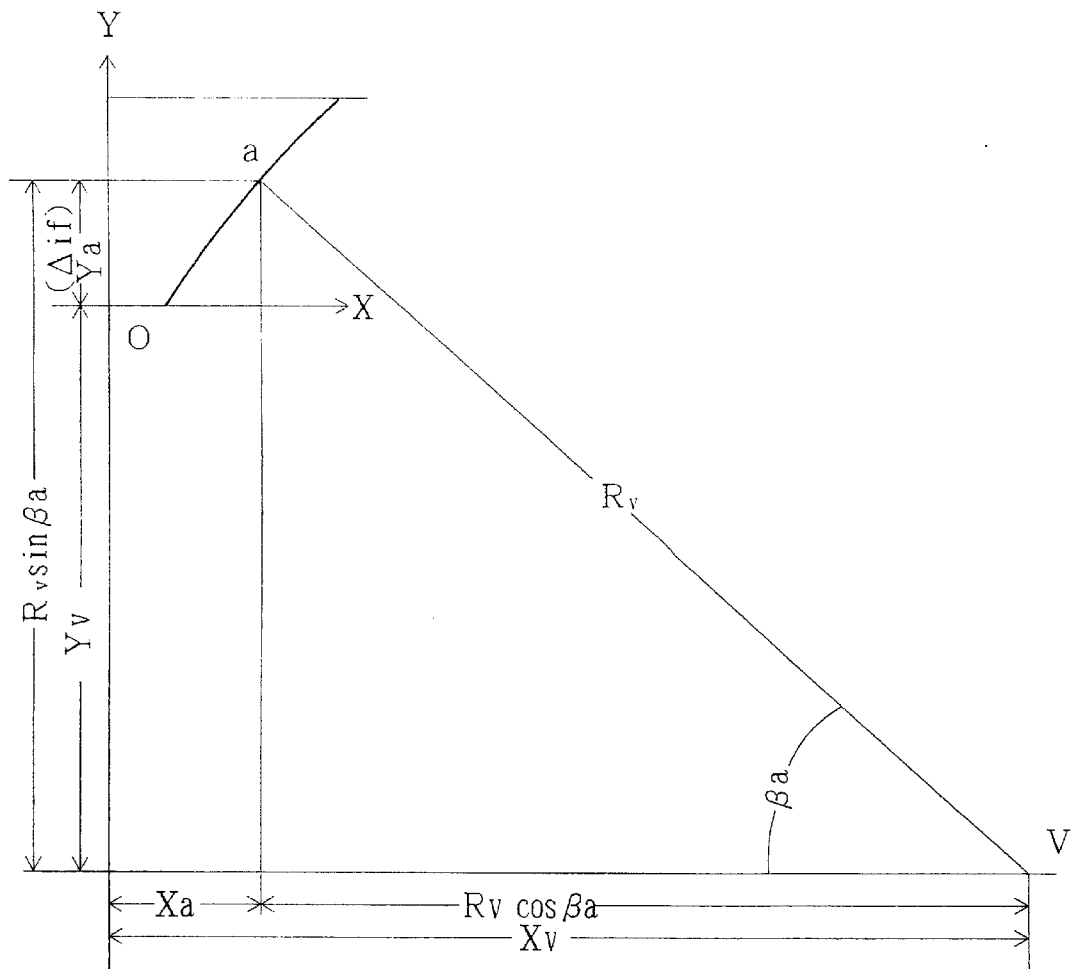
FIG. 7 is a diagram illustrating a calculation for finding coordinates of any lens position on an arc.

From the radius $R_V$ of the arc and the center coordinates $X_V$, $Y_V$, furthermore, a lens position a on an arc shown in FIG. 7 is, $$\beta a=\sin^{-1}((\Delta if-Y_V)/R_V)$$

$$Xa=X_V-R_V\cos\beta a$$

Table of FIG. 8 shows calculated values of $\Delta$if of the arc D, Sl, $\beta$a and Xa.

In this example, the window of the stereo slide mount is set to 2.5 meters when the focal point is adjusted to infinity. When the focal point is adjusted to about 700 mm, the window of the stereo slide mount appears at about 700 mm which is equal to the focal distance. When the focal point is adjusted to a distance shorter than about 700 mm, the window of the stereo slide mount may appear slightly farther than the focal distance. However, the difference is so small that the offset needs be corrected by a very small amount at the time of mounting. When the arc data shown in the table of FIG. 8 are applied to a stereo camera of which the shortest focal distance is larger than 700 mm, the optimum effect for correcting the distance between the optical axes can be obtained under almost all conditions.

Figure 9:
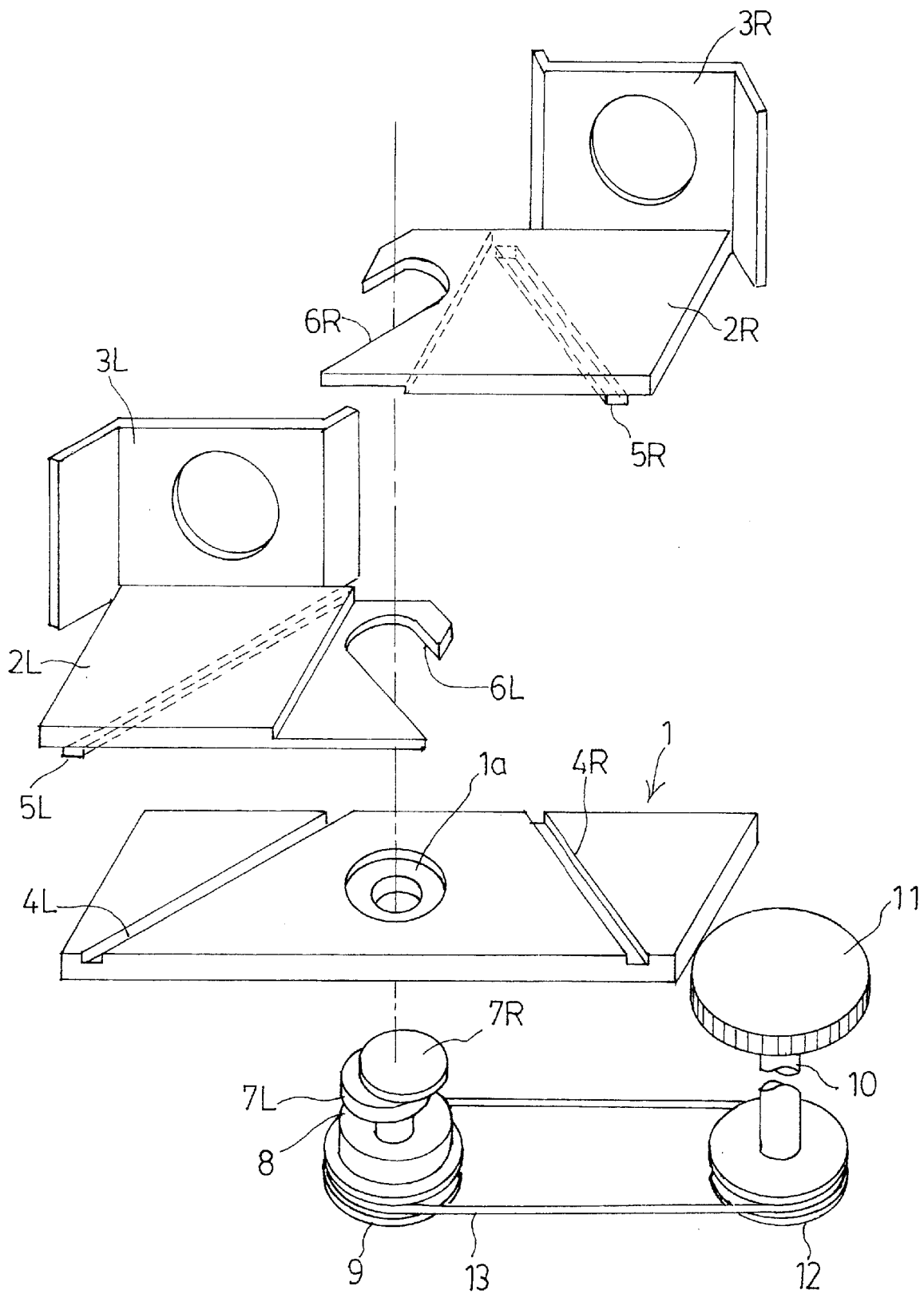
FIG. 9 is a diagram illustrating, in a disassembled manner, a mechanism of the type of linear motion for automatically adjusting the distance between the optical axes according to the embodiment of the present invention.

Next, concretely described below is the structure of the mechanism for automatically adjusting the distance between the optical axes. FIG. 9 illustrates the mechanism for automatically adjusting the distance between the optical axes by linearly moving the lens boards, wherein reference numeral 1 denotes a slide base, and 2L and 2R denote sliders, the sliders 2L, 2R and lens boards 3L, 3R at the front portions thereof being coupled together as unitary structures. Right-and-left symmetrical linear tilted guide grooves 4L and 4R are formed in the upper surface of the slide base secured to the bottom part of the camera body, and ribs 5L and 5R are formed on the lower surfaces of the sliders 2L and 2R so as to be opposed to the guide grooves 4L and 4R.

Linear parallel grooves 6L and 6R are formed in the inside portions of the right and left sliders 2R, 2L, i.e., in the inner sides of the optical axes of the right and left photographing lenses, the directions of the parallel grooves 6L and 6R being at right angles with the directions of the ribs 5L, 5R.

The upper half of the inner portion of the left slider 2L in which the parallel groove 6L is formed, is cut away so as to have a thickness one-half the thickness of the slider 2L. The lower half of the inner portion of the right slider 2R is cut away, too, so as to have a thickness one-half the thickness of the slider 2R. In a state where the sliders 2L and 2R are mounted on the slide base 1, the inner portions of the right and left sliders 2R and 2L are superposed one upon the other.

A bearing 8 of cams for moving the lenses is mounted on a central bearing-mounting hole la formed in the slide base 1. The cams 7L and 7R are mounted in upper and lower two stages on an upper part of a shaft for adjusting the focal point, and a pulley 9 is attached to a lower part of the shaft for adjusting the focal point.

The left cam 7L and the right cam 7R are circular eccentric cams of the same shape, have a diameter nearly equal to the width of the parallel grooves 6L, 6R in the sliders 2L, 2R, and are mounted on the shaft for adjusting the focal point maintaining a rotational angular difference equal to an angle subtended by the right and left guide grooves 4R, 4L, the left cam 7L engaging with the parallel groove 6L of the left slider 2L and the right cam 7R engaging with the parallel groove 6R of the right slider 2R.

A knob 11 for adjusting the focal point is attached to the head of a pulley shaft 10 supported by a camera body (not shown), and a wire 13 or a belt is wrapped round a pulley 12 attached to a lower part of the pulley shaft 10 and a pulley 9 of the shaft for adjusting the focal point.

When the knob 11 for adjusting the focal point is turned, the cams 7L and 7R are turned being interlocked to each other, the right and left sliders 2R, 2L move aslant along the guide grooves 4L, 4R in synchronism with each other, and the distance between the optical axes is automatically adjusted being interlocked to the adjustment of the focal point. As described above, the directions of the parallel grooves 6L, 6R are at right angles with the directions of the guide grooves 4L, 4R, and the directions in which the sliders 2L, 2R move are in agreement with the directions in which the pushing forces of the cams 7L, 7R act. Therefore, the sliders 2L, 2R slide smoothly.

If the wire 13 wrapped round the pulleys 9 and 12 is secured at a point on the circumferences of the pulleys 9 and 12, though this pertains to a widely known means, the wire 13 is prevented from slipping, and the pair of pulleys 9 and 12 can be reliably rotated in synchronism.

Figure 10:
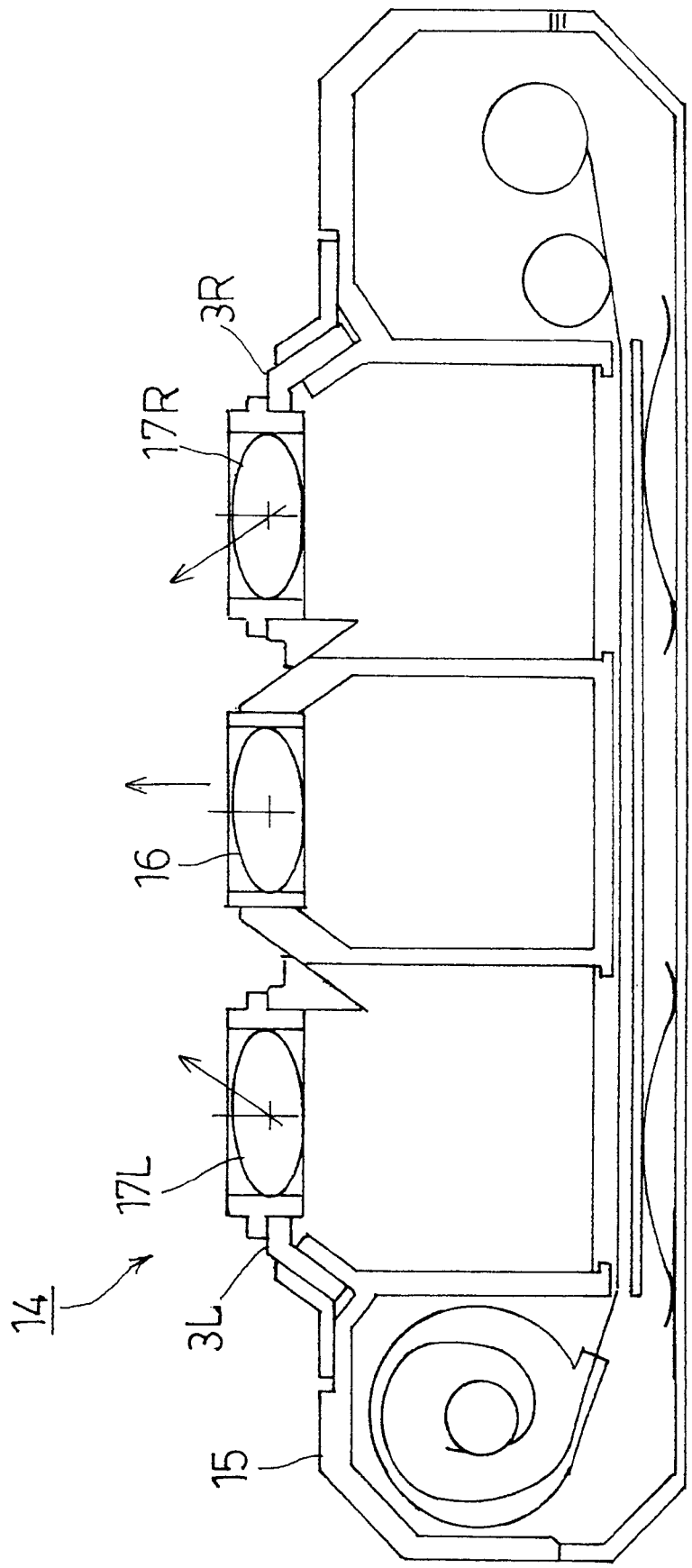
FIG. 10 is a sectional view of a stereo camera of the type of linear motion.
Figure 11:
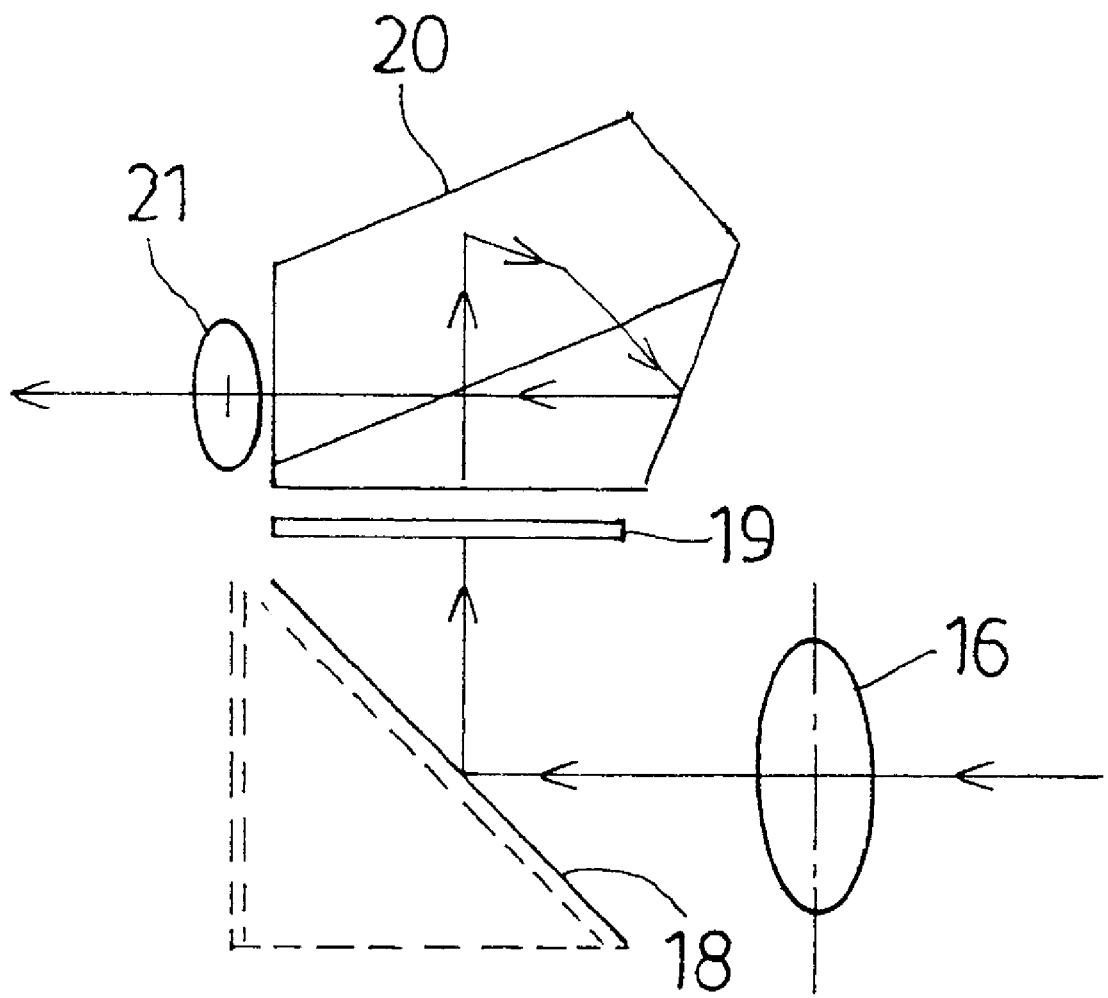
FIG. 11 is a diagram illustrating the constitution of a finder portion of the stereo camera of FIG. 10.

FIG. 10 illustrates a three-lens type stereo camera 14 mounting a mechanism for linearly adjusting the distance between the optical axes of FIG. 9, wherein a finder lens 16 is arranged at the center on the front surface of a camera body 15, and a pair of photographing lenses 17L, 17R are arranged on the right and left sides thereof in line in the lateral direction, and the optical axes of the three lenses 16, 17L and 17R are in parallel and are positioned on the same plane. A focal plane shutter (not shown) is arranged at the back of the photographing lenses 17L, 17R in just front of the exposed surfaces. Referring to FIG. 11, a 45-degree reflex mirror 18 is secured at the back of the finder lens 16. Light falling on the finder lens 16 passes through the reflex mirror 18, focused on an upper focusing plate 19, and can be observed as an erect image through a penta prism 20 and an eyepiece 21 in the same manner as the general single-lens reflex camera.

Figure 12:
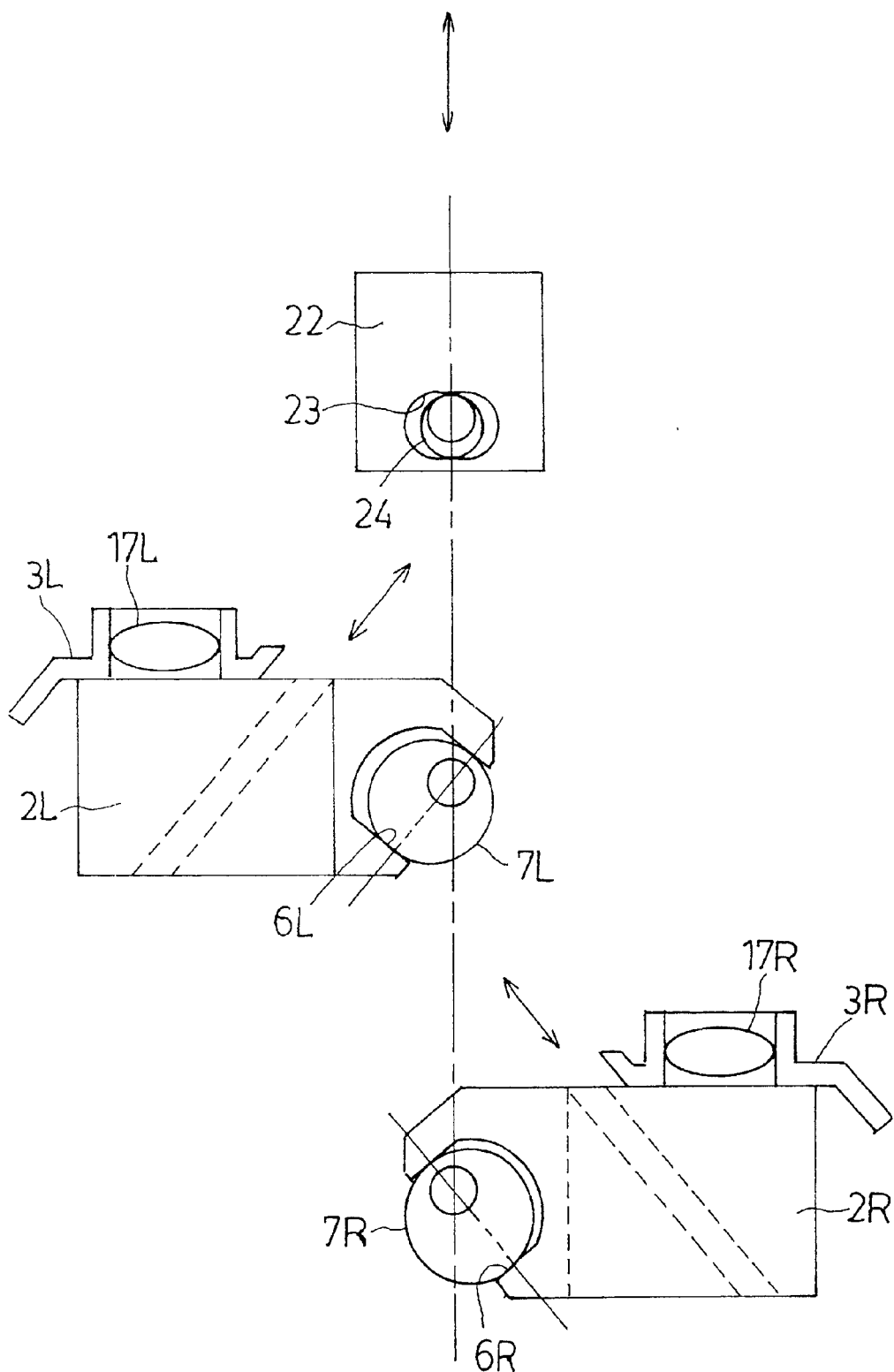
FIG. 12 is a diagram illustrating the constitution of a mechanism for automatically adjusting the distance between the optical axes in the stereo camera of FIG. 10.

FIG. 12 illustrates sliders 22 for mounting a finder lens board, and lens boards 3L, 3R for photographing lenses. The sliders 22 are provided with a parallel groove 23 in the right-and-left direction, and a circular eccentric cam 24 for moving the finder lens is engaged with the parallel groove 23, the circular eccentric cam 24 being provided on the shaft for adjusting the focal point like the cams 7L, 7R for moving the photographing lenses. Therefore, the three lenses 16, 17L and 17R move back and forth in synchronism being interlocked to the turn of the shaft for adjusting the focal point, and the state for adjusting the focal point can be judged depending upon the state where the image is focused on the focusing plate 19.

The finder lens 16 may have a focal distance equal to that of the photographing lenses 17L, 17R. However, use of the finder lens having a focal distance shorter than that of the photographing lenses makes it possible to decrease the space occupied by the finder portion. In this case, the size of the focusing plate 19 shown in FIG. 11 is decreased, the angle of image on the focusing plate is brought into agreement with the angle of images exposed through the photographing lenses 17L, 17R. Besides, the shape and size of the cam 24 for moving the finder lens and the width of the parallel groove 23 in the sliders 22, are so designed that the moving amount of the finder lens satisfies the formula $\Delta if = f^2/(L-f)$.

Figure 13:
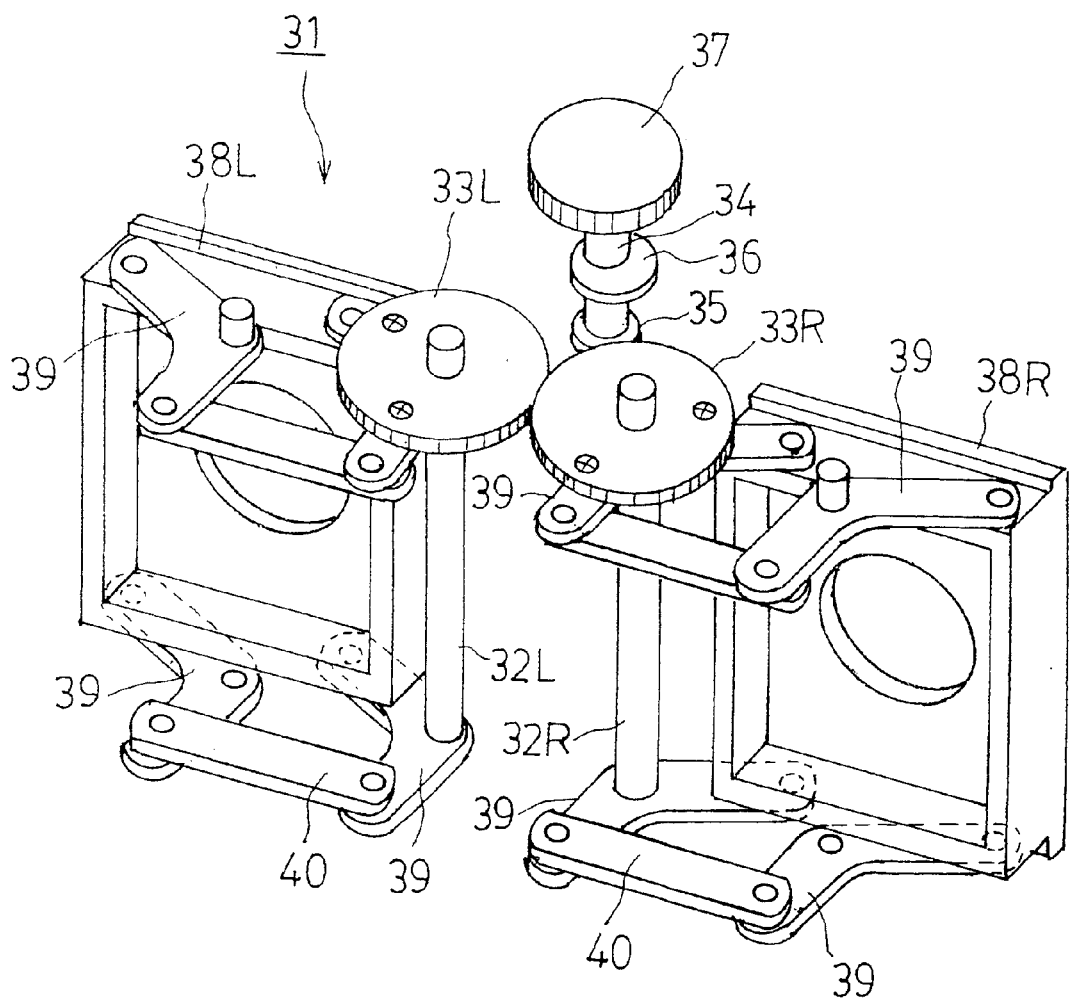
FIG. 13 is a diagram illustrating the constitution of the mechanism of the type of arcuate motion for automatically adjusting the distance between the optical axes.

FIG. 13 illustrates a mechanism for adjusting the distance between the optical axes being interlocked to the adjustment of the focal point in the stereo camera in order to move the photographing lenses along an arcuate loci. Two right and left vertical shafts 32R and 32L are rotatably mounted on a body frame (not shown) of the stereo camera 31, and synchronizing gears 33L and 33R of the same shape are in mesh with each other being mounted on the upper portions of the two vertical shafts 32L and 32R. A pinion gear 35, a cam 36 for moving a movable mirror of a range finder and a knob 37 for adjusting the focal point, are attached to a shaft 34 for adjusting the focal point disposed in front of the vertical shafts 32L, 32R, and a pinion gear 35 is brought into mesh with the one synchronizing gear 33R.

Bell crank-shaped levers 39 are secured to the upper and lower portions of the vertical shafts 32L, 32R. Upper and lower two bell crank-shaped levers 39 disposed on the outer sides of the vertical shafts 32L, 32R are supported by the upper and lower bearings of which the central shafts are provided on the body frame (not shown). The front ends of these right and left four levers 39 are pivoted near to the inner ends and the outer ends on both the upper and lower surfaces of the right and left lens boards 38R, 38L. Moreover, the rear ends of the opposing two levers are coupled together by links 40 to constitute parallel linking mechanisms.

The lever-pivoting points of the right and left lens boards 38R, 38L are located on the outer sides of the vertical shafts 32L, 32R. Upon turning the knob 37 for adjusting the focal point, therefore, the right and left lens boards 38R, 38L undergo a parallel motion on arcuate loci maintaining a right angled relationship with respect to the optical axes of the photographing lenses. Furthermore, the state of adjusting the focal point can be viewed by turning the movable mirror of the range finder due to the cam 36 for the range finder. The structure of the range finder has been widely known and is not described here.

Figure 14:
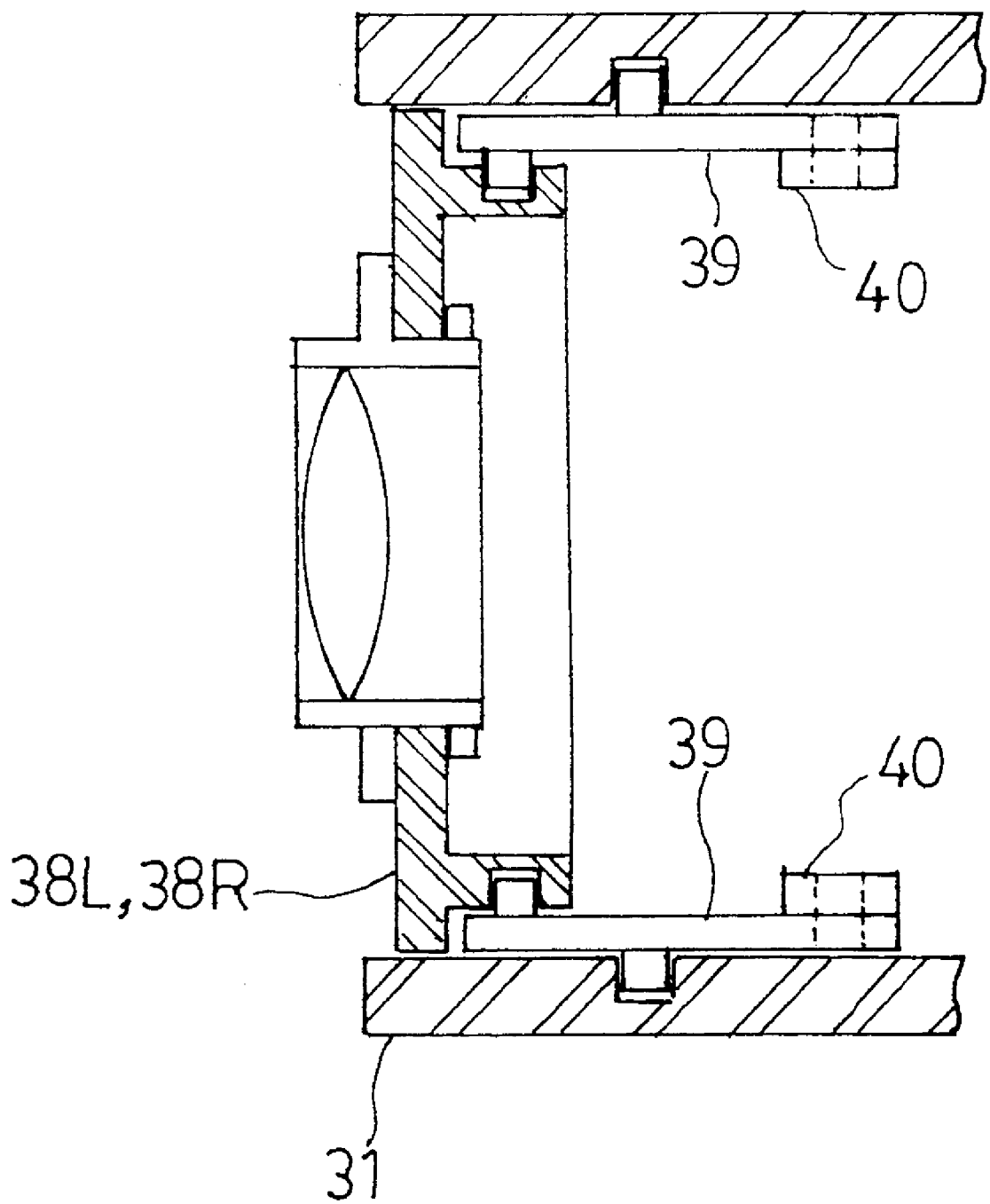
FIG. 14 is a vertical sectional view illustrating the structure for coupling a lens board to the camera body of FIG. 13.

FIG. 14 illustrates the structure for mounting the lens boards 38L, 38R on the camera body. The upper and lower both ends of the lens boards slide in contact with the upper and lower wall surfaces of the stereo camera 31 to interrupt light coming from the outside, and correctly maintain the positions of the lens boards 38L, 38R in the up-and-down direction. As means for shielding the gaps between the side surfaces of the lens boards and the camera body, furthermore, thin leaf springs that will be described later are attached to the camera body and are resiliently contacted to the side surfaces of the lens boards thereby to shield the gaps between the lens boards and the camera body.

The radii of arcuate loci along which the lens boards 38L, 38R move are determined by distances between the lever-pivoting points of the lens boards 38L, 38R and the centers of the vertical shafts 32L, 32R shown in FIG. 13. A variety of arcuate loci as shown in FIGS. 5 and 6 can be realized depending upon the lengths of the levers and the central positions of the vertical shafts 32L, 32R.

The links 40 coupling the levers 39 may be omitted. When the links 40 are omitted, straight lines passing through the two lever-pivoting points on both the right and left sides of the lens boards 38L, 38R approach the vertical shafts 32L, 32R, and the operation may lose smoothness when the dead points of the parallel linking mechanisms are approached. Upon coupling the other ends of the bell crank-shaped levers 39 with the links 40, however, the dead points can be eliminated, and smooth operation is realized throughout the whole range of motion.

Figure 15:
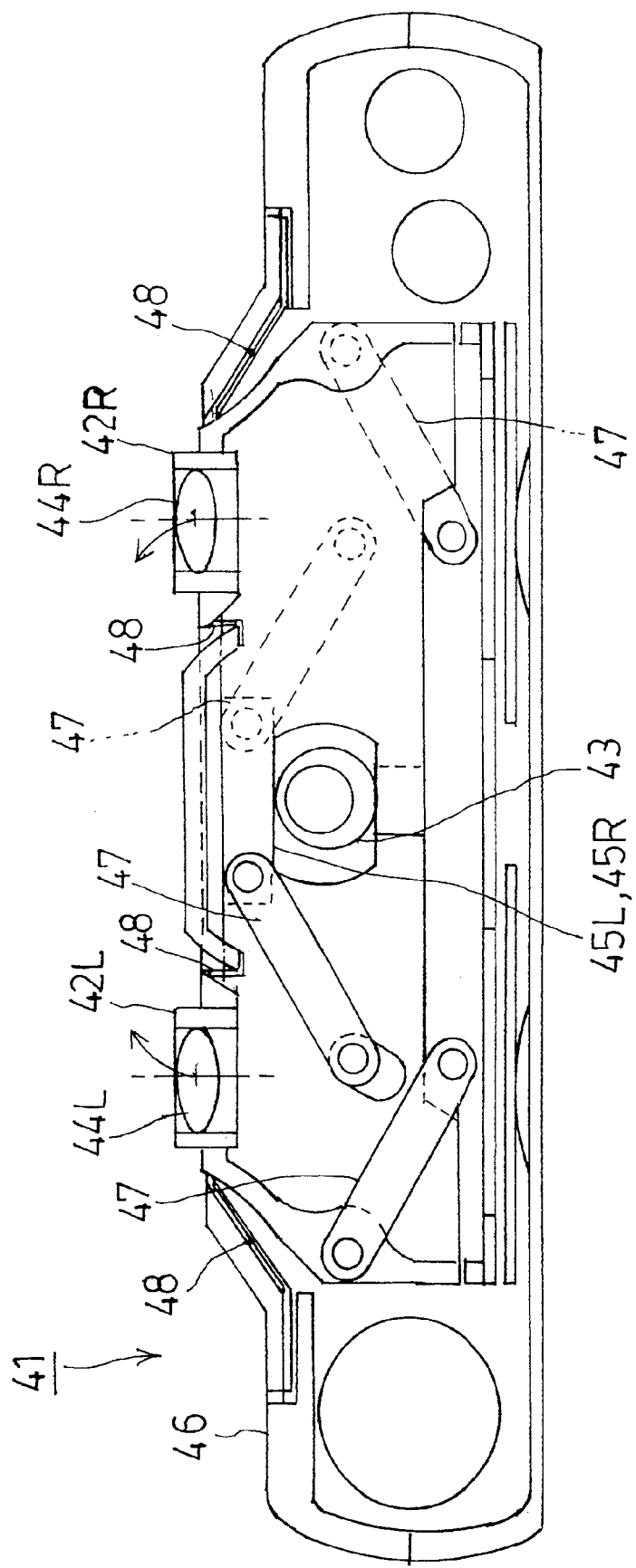
FIG. 15 is a sectional view of a stereo camera of the type of arcuate motion.

FIG. 15 illustrates the stereo camera according to another embodiment. In this stereo camera 41, the right and left lens boards 42R and 42L are driven in a synchronized manner through the cam 43, so that the photographing lenses 44L and 44R move along arcuate loci. As shown in FIGS. 16(L) and 16(R), straight parallel grooves 45R and 45L are formed in the inner portions of the right and left lens boards 42R, 42L in a direction at right angles with the optical axes of the photographing lenses 44R and 44L.

Like the lens boards 2L, 2R in FIG. 12, the upper half is cut away from a portion forming a groove on the inner side of the left lens board 42L so as to have a thickness one-half the thickness of the lens board 42L. The upper half is cut away, too, from a portion forming a groove of the right lens board 42R so as to have a thickness one-half the thickness of the lens board 42R. The cut-away portions of the right and left lens boards 42R and 42L are superposed one upon the other, and are coupled to the camera body 46 via two links 47 having an equal length.

A circular eccentric cam 43 disposed at the center of the base frame 46 is inserted in the parallel grooves 45R, 45L of the right and left lens boards 42R, 42L. Upon turning the shaft for adjusting the focal point on which the cam 43 is mounted, the right and left lens boards 42R, 42L move symmetrically along the arcuate loci.

The side surfaces of the lens boards 42R, 42L are formed in an arcuate shape being curved in an opposing manner relative to the loci of motion, and the edges at the ends of the leaf springs 48 attached to the camera body 46 are resiliently contacted to the side surfaces of the lens boards 42R, 42L. Therefore, no gap is formed between the leaf springs 48 and the lens boards 42R, 42L irrespective of the positions of the lens boards for adjusting the focal point, and the interior of the camera body 46 is kept off from the infiltration of light, dust or water droplets.

Figure 17:
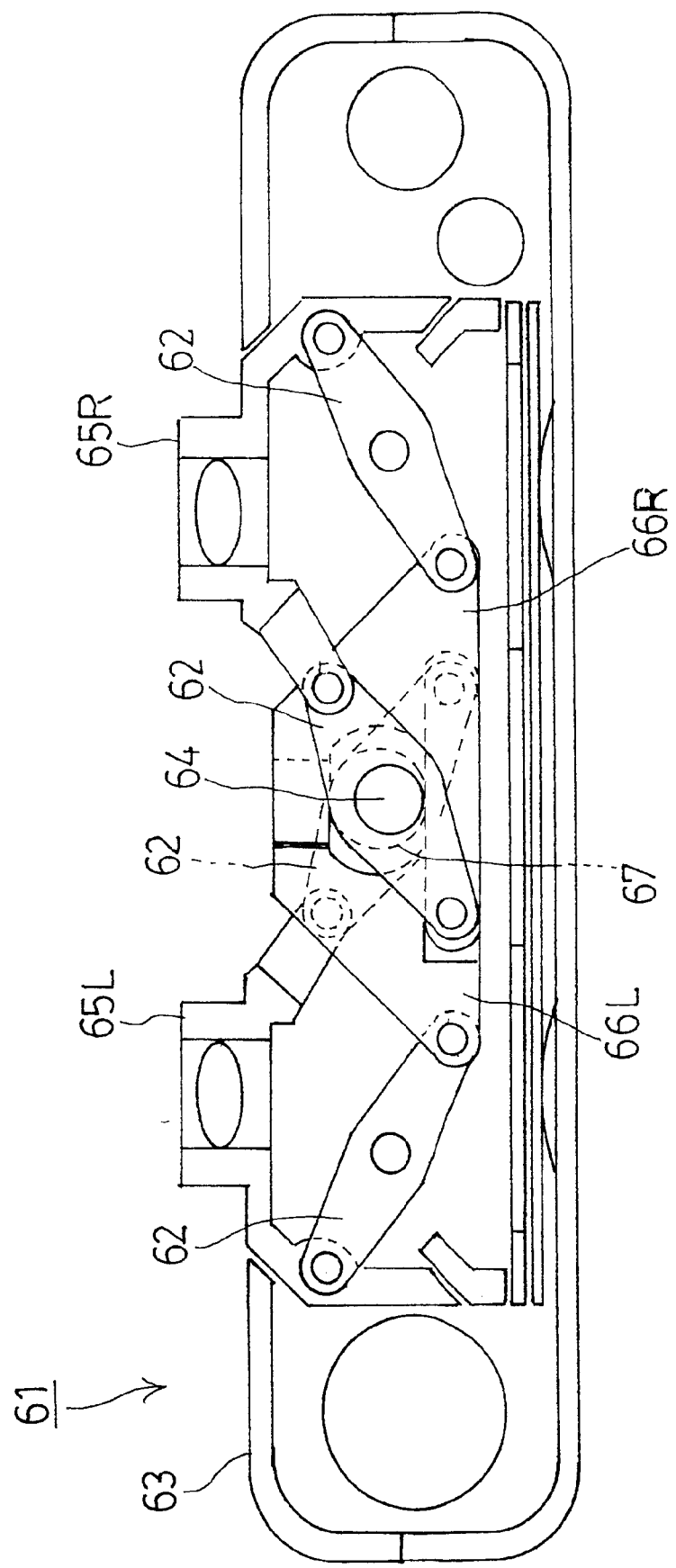
FIG. 17 is a sectional view of the stereo camera of the type of arcuate motion according to another embodiment.
Figure 20L:
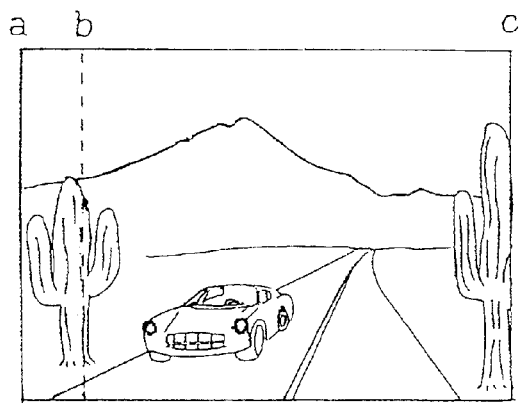
FIGS. 20(L) and 20(R) are diagrams illustrating films photographed by using a conventional stereo camera.
Figure 20R:
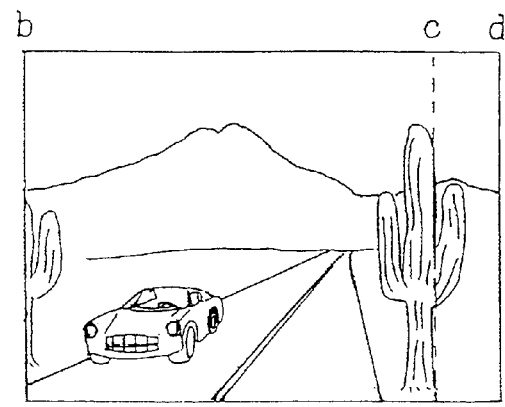
Figure 21:
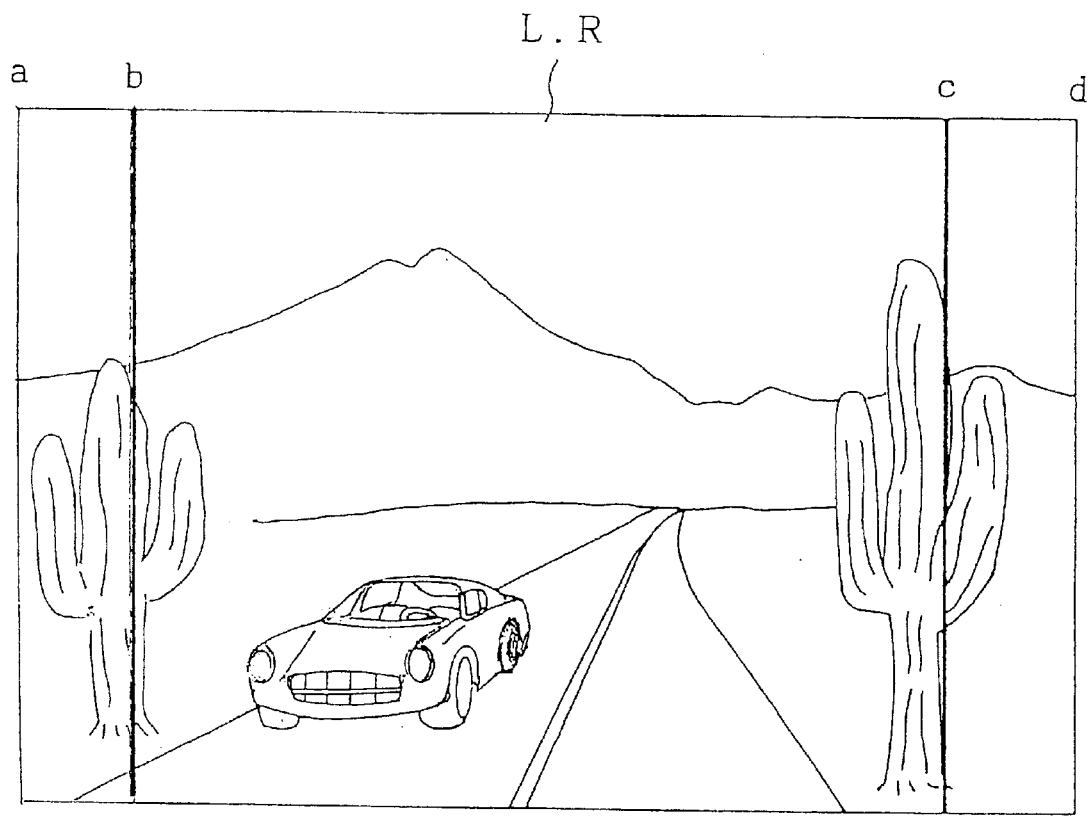
FIG. 21 is a diagram illustrating losses of picture using the conventional stereo camera.

FIGS. 17 and 18 illustrate another embodiment. In this stereo camera 61, the links have a length shorter than that of the stereo camera 41 of FIG. 14. The right and left two links 62 are pivoted at their intermediate points, and the central two links 62 are rotatably mounted on the shaft 64 for adjusting the focal point.

A left lens board 65L is coupled to the front ends of the two links 62 constituting a parallel linking mechanism of the left side, a right lens board 65R is coupled to the front ends of the two links 62 constituting a parallel linking mechanism of the right side, and the other ends of the two sets of links are coupled together by cam follower links 66L, 66R.

A circular eccentric cam 67 is engaged with parallel grooves 68L, 68R of two pieces of cam follower links 66L, 66R that are superposed one upon the other. When the cam 67 is turned, the right and left lens boards 65R and 65L move symmetrically describing arcs via the cam follower links 66L, 66R. The action is the same as that of FIG. 14. However, the radius of arcs is smaller since the levers are shorter than those of FIG. 14.

In a stereo camera 71 shown in FIG. 19, the front portions of the right and left two links 72 constituting a parallel linking mechanism are pivoted to the camera body 73, and the rear ends of the links 72 are pivoted to the rear portions of the lens boards 74L, 74R. The centers of radii of loci along which the right and left lens boards 74R and 74L move are positioned on the outer sides of the optical axes; i.e., the arcuate loci are approximate to the curved loci of the conventional mechanism for automatically adjusting the distance between the optical axes.

The applicant has proposed already a stereo camera for synthesizing a finder picture by projecting, onto a focusing plate, the inner one-halves of an inverted image (the left one-half of the visual field of the left photographing lens and the right one-half of the visual field of the right photographing lens) that is incident through the two photographing lenses relying upon the combination of a reflex mirror and one or a plurality of prisms. In this stereo camera, the right and left one-halves of the image in the finder are brought close to each other or are separated away from each other making it possible to judge the focusing state depending upon the distance for adjusting the focal point of the photographing lenses.

In the stereo camera equipped with the mechanism for adjusting the distance between the axes, the right and left one-halves of the image in the finder are brought close to each other or are separated away from each other even relying upon a change in the distance between the optical axes of the photographing lenses and, hence, the finder system must be equipped with means for correcting the pitch between the right and left one-halves of the image. To cope with this need, there has been proposed a stereo camera equipped with a mechanism which makes it possible to correctly adjust-the focal point by automatically correcting the visual fields of the right and left finder systems by moving part or whole of the composite prism back and forth being interlocked to a change in the distance between the optical axes.

When the above-mentioned prism finder is mounted on the stereo camera of the present invention, a cam for moving the prism is mounted on the shaft for adjusting the focal point like the circular eccentric cam 24 for moving the finder lens shown in FIG. 12, and part or whole of the prism is moved back and forth being interlocked to the adjustment of the focal point/distance between the optical axes, in order to correct the pitch between the right and left one-halves of the image of the finder system and to highly precisely adjust the focal point.

As described above, the present invention deals with a stereo camera in which the distance between the optical axes of the photographing lenses is automatically adjusted depending upon the distance of taking a picture, wherein the photographing lenses are moved along the linear loci or arcuate loci corrected by taking the human visual sense into consideration. Therefore, the stereo camera is almost free from unnatural perspective feeling that was often encountered with the conventional stereo cameras. Thus, the stereo camera of the invention enables everybody to easily shoot stereo pictures maintaining the highest stereo effect, contributing to enhancing the practicability of the stereo camera.

The present invention is in no way limited to the above-mentioned embodiments only, but can be modified in a variety of ways without departing from the technical scope of the invention, and the invention encompasses such modifications as a matter of course.

What is claimed is:

1. A stereo camera provided with a mechanism for adjusting a distance between optical axes, in which two photographing lenses are mounted on independent right and left lens boards, a distance between the right and left lens boards is changed being interlocked to back-and-forth motion of the right and left lens boards accompanying an operation for adjusting a focal point, and a distance between the optical axes of the two photographing lenses is corrected depending upon a focal distance, wherein arcuate loci of motion of the two photographing lenses are right-and-left symmetrical arcs passing through positions at where a distance between the optical axes of the two photographing lenses at a position for adjusting a focal point to infinity is narrower than a pitch between the right and left exposed pictures or, preferably, through positions within a range of distances between the optical axes in which visual fields of the two photographing lenses are brought into agreement at a distance of 2 to 3 meters in front of main points of the photographing lenses along the optical axes, and through positions of the distance between the optical axes at where the visual fields of the two photographing lenses at a position for adjusting the shortest focal point are brought into agreement at a focal distance or through the positions at where a distance between the optical axes is slightly narrower than a distance between the optical axes with which the visual fields are brought into agreement at the focal distance.

2. A stereo camera according to claim 1, wherein centers of radii of said arcuate loci of motion are located on a center side between the two photographing lenses.

3. A stereo camera according to claim 2, wherein said arcuate loci of motion of the two photographing lenses are right-and-left symmetrical arcs passing through positions within a range of the distances between the optical axes in which the visual fields of the two photographing lenses at a position for adjusting the focal point to infinity are in agreement at a distance of 2 to 3 meters in front of the main points of the photographing lens along the optical axes, through positions of the distance between the optical axes at where the visual fields of the two photographing lenses at a position for adjusting the focal point to a subject at a distance of about one meter are in agreement at a focal distance, and through the positions of a distance between the optical axes at where the visual fields of the two photographing lenses at a position for adjusting the shortest focal point are brought into agreement at a focal distance.

4. A stereo camera according to claim 2, wherein said arcuate loci of motion of the two photographing lenses are right-and-left symmetrical arcs passing through positions within a range of distances between the optical axes in which the visual fields of the two photographing lenses at a position for adjusting the focal point to infinity are in agreement at a distance of 2 to 3 meters in front of the main points of the photographing lens along the optical axes, through positions of a distance between the optical axes at where the visual fields of the two photographing lenses at a position for adjusting the focal point to a subject at a distance of about one meter are in agreement at a focal distance, and through the positions at where the distance between the optical axes is slightly narrower than a distance between the optical axes with which the visual fields of the two photographing lenses at a position for adjusting a shortest focal point are brought into agreement at a focal distance.

5. A stereo camera according to claim 2, wherein said arcuate loci of motion of the two photographing lenses are right-and-left symmetrical arcs passing through positions within a range of distances between the optical axes in which the visual fields of the two photographing lenses at a position for adjusting the focal point to infinity are in agreement at a distance of 2 to 3 meters in front of the main points of the photographing lenses along the optical axes, and through positions of the distance between the optical axes slightly narrower than the positions of the distance between the optical axes at where the visual fields of the two photographing lenses at a position for adjusting a shortest focal point are brought into agreement at a focal distance, a distance between the optical axes being narrower than a distance between the optical axes in which the visual fields are in agreement at the focal distance throughout the whole range of adjusting the focal point.

6. A stereo camera according to claim 1, wherein the right and left lens boards are mounted on a camera body via a plurality of links to constitute right and left sets of parallel linking mechanisms, and the right and left lens boards and the two photographing lenses are moved along right-and-left symmetrical arcuate loci.

7. A stereo camera according to claim 6, wherein gears of the same shape are attached to rotary shafts of said right and left sets of parallel linking mechanisms, said gears are brought into mesh with each other, and said right and left sets of parallel linking mechanisms are operated in synchronism with each other.

8. A stereo camera according to claim 6, wherein inner portions of the right and left lens boards mounted on said right and left sets of parallel linking mechanisms are superposed one upon the other, parallel grooves are formed in the superposed portions being displaced by nearly about 90 degrees with respect to a direction of the optical axes, a shaft for adjusting a focal point is disposed between the right and left lens boards, a cam having a fitting diameter nearly equal to the width of said parallel grooves is secured to the shaft for adjusting a focal point, said cam is engaged with the parallel grooves formed in the right and left lens boards, and the shaft for adjusting a focal point is turned, so that the right and left lens boards move in synchronism along the arcuate loci.

9. A stereo camera according to claim 6, wherein leaf springs are attached to the portions where the right and left lens boards are mounted on the camera body of said stereo camera, and are resiliently contacted to side surfaces of the right and left lens boards, in order to conceal gaps between the camera body and the right and left lens boards.

10. A stereo camera according to claim 6, wherein sliders mounting finder lenses are mounted to slide back and forth between the right and left lens boards, means for moving the sliders, is attached to the shaft for adjusting a focal point to move the right and left lens boards, and an interlocking mechanism is constituted for adjusting a focal point/distance between the optical axes of the right and left lens boards and for adjusting a focal point of the finder lens.

11. A stereo camera according to claim 6, wherein a prism-type finder is provided between said right and left lens boards to synthesize a finder picture by projecting, onto a focusing plate, a left one-half picture in a visual field of the left photographing lens and a right one-half picture in a visual field of the right photographing lens using a composite prism, said composite prism is partly or wholly mounted on the sliders maintaining freedom of sliding in the back-and-forth direction, means for moving the sliders, is attached to the shaft for adjusting the focal point to move the lens boards, and an interlocking mechanism is constituted for adjusting the focal point/distance between the optical axes of the two lens boards and for correcting the visual field of the composite prism.

12. A stereo camera comprising:

a right lens having a right optical axis and forming a right image at a right photographing location;

a left lens having a left optical axis and forming a left image at a left photographing location, the right and left photographing locations separated by a first distance;

a focusing mechanism coupled to said right and left lenses; and linkage means, coupled to said right lens, said left lens, and said focusing mechanism, for symmetrically shifting said right lens and said left lens in arcuate loci of motion causing said right image and said left image to shift relative to each other and the right optical axis and the left optical axis to be closer together than the first distance when said right lens and said left lens are focused at an infinite focal point, the arcuate loci of motion having center of radii on the same side as a center between said right and left lenses and contrary to a center of radii of a curved reference loci in which the right and left images are brought into agreement.

13. A stereo camera as in claim 12, the arcuate loci intersects the curved reference loci.

14. A stereo camera as in claim 12, wherein:

said linkage means comprises a parallel linking mechanism.

15. A stereo camera comprising:

a body;

right and left shafts attached to said body;

right and left synchronizing gears mounted on a respective one of said right and left shafts, said right and left synchronizing gears in mesh with each other;

a pinion gear in mesh with one of said right and left synchronizing gears;

a knob attached to said pinion gear, whereby focus is capable of being adjusted;

a right and left lens board having respective right and left lenses therein;

a right plurality of levers having one end attached to said right lens board and coupled to said right shaft;

a left plurality of levers having one end attached to said left lens board and coupled to said left shaft;

a right link connecting another end of said right plurality of levers; and a left link connecting another end of said left plurality of levers, whereby turning of said knob courses said right and left lens boards to synchronously move in arcuate loci.

16. A stereo camera as in claim 15 wherein:

the arcuate loci has a center of radii on the same side as a center between the right and left lenses.

17. A stereo camera comprising:

a base frame;

a right and left lens board placed on said base frame;

a right and left groove formed in a respective said right and left lens board;

a right pair of parallel links having a pair of ends attached to said right lens board and another pair of ends attached to said base frame;

a left pair of parallel links having a pair of ends attached to said left lens board and another pair of ends attached to said base frame; and a cam placed within said right and left groove, whereby turning said cam causes said right and left lens boards to synchronously move in arcuate loci.

18. A stereo camera as in claim 17 wherein:

the arcuate loci has a center of radii on the same side as a center between the right and left lenses.

19. A stereo camera as in claim 17 wherein:

one of said right pair of parallel links is pivoted at an intermediate point; and one of said left pair of parallel links is pivoted at an intermediate point.

* * * * *